(12) United States Patent
Shimada et al.

(10) Patent No.: US 10,012,512 B2
(45) Date of Patent: Jul. 3, 2018

(54) OPERATION SUPPORT METHOD AND OPERATION SUPPORT DEVICE

(71) Applicant: FUJITSU LIMITED, Kawasaki-shi, Kanagawa (JP)

(72) Inventors: Takashi Shimada, Shinagawa (JP); Kiyohide Omiya, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/437,734

(22) Filed: Feb. 21, 2017

(65) Prior Publication Data

US 2017/0241789 A1 Aug. 24, 2017

(30) Foreign Application Priority Data

Feb. 22, 2016 (JP) .................................. 2016-031483

(51) Int. Cl.
  *G01C 21/00* (2006.01)
  *G01C 21/34* (2006.01)
(52) U.S. Cl.
  CPC ....... *G01C 21/343* (2013.01); *G01C 21/3492* (2013.01)
(58) Field of Classification Search
  CPC .......................... G01C 21/343; G01C 21/3492
  USPC ......................................... 701/533, 430, 537
  See application file for complete search history.

(56) References Cited

U.S. PATENT DOCUMENTS

| 5,978,733 A * | 11/1999 | Deshimaru ........ G01C 21/3614 340/988 |
| 8,682,583 B2 * | 3/2014 | Okude ............... G01C 21/3492 340/995.12 |
| 2006/0161337 A1 * | 7/2006 | Ng ..................... G01C 21/3423 701/533 |

(Continued)

FOREIGN PATENT DOCUMENTS

| JP | 2002-324294 A | 11/2002 |
| JP | 2003-281676 A | 10/2003 |

(Continued)

OTHER PUBLICATIONS

Office Action dated Feb. 14, 2017, issued in counterpart Japanese Application No. 2016-031483, with English translation (7 pages).

*Primary Examiner* — Gertrude Arthur Jeanglaude
(74) *Attorney, Agent, or Firm* — Westerman, Hattori, Daniels & Adrian, LLP

(57) ABSTRACT

A method includes receiving an input of a departure point, an arrival point, and a desired arrival time of a specific vehicle to be operated, extracting, from a plurality of route information, a part of route information corresponding to routes that departed from or passed through around the departure point, and arrived at or passed through around the arrival point within a certain time range of the desired arrival time, classifying the part of route information into a plurality of route groups by comparing each other, counting a number of route information classified in each route groups, calculating, for each route groups, a ratio of the number of route information classified in each route groups to total number (Continued)

of the part of route information, and outputting operation information based on the ratio, the operation information including at least one of specific route as candidates for the specific vehicle.

16 Claims, 27 Drawing Sheets

(56) References Cited

U.S. PATENT DOCUMENTS

2017/0011270 A1   1/2017   Kamada

FOREIGN PATENT DOCUMENTS

| | | |
|---|---|---|
| JP | 2015-75859 A | 4/2015 |
| JP | 2015-125611 A | 7/2015 |
| WO | 2015/129045 A1 | 9/2015 |

* cited by examiner

FIG. 4

| ID | VEHICLE TOTAL WEIGHT | MAXIMUM CARRYING CAPACITY | VEHICLE BODY SHAPE | RIDING CAPACITY | ... |
|---|---|---|---|---|---|
| 1234567 | 24940 | 13200 | 21 | 2 | ... |
| 1234568 | 24940 | 13200 | 21 | 2 | ... |
| ⋮ | | | | | |

FIG. 5

| ID | DATE AND TIME | LOCATION | SPEED | ACCELERATION RATE | ... |
|---|---|---|---|---|---|
| 1234567 | 2015/6/1 8:02:00 am | N35.XX, E139.XX | 40 | (2, 0.5, 0) | ... |
| 1234568 | 2015/6/1 8:02:01 am | N35.XX, E139.XX | 20 | (1, 0.1, 0) | ... |
| ... | ... | ... | ... | ... | |
| 1234567 | 2015/6/1 0:00:00 pm | N35.XX, E139.XX | 0 | (0, 0, 0) | ... |

FIG. 6

| LOCATION | ... | 2:00 pm | 3:00 pm | 4:00 pm | ... |
|---|---|---|---|---|---|
| N35.XX, E139.XX | | 1 | 1 | 2 | ... |
| ⋮ | | | | | |

FIG. 7

| SECTION ID | DETERIORATION LEVEL | ... |
|---|---|---|
| XXXXX | 1 | ... |
| ⋮ | | |

FIG. 8

| FACILITY ID | NAME | LOCATION | TYPE | NUMBER OF VEHICLES CAPABLE OF BEING PARKED | ... |
|---|---|---|---|---|---|
| 0001 | SERVICE AREA XXX | XXXXX | SA | 80 | ... |
| 0002 | PARKING AREA XXX | XXXXX | PA | 30 | ... |
| 0003 | ROADSIDE STATION XXX | XXXXX | ROADSIDE STATION | 10 | ... |
| ⋮ | | | | | |

FIG. 9

| CODE | CLASSIFICATION | IMPORTANT POINTS | | |
|---|---|---|---|---|
| | | PERIOD OF TIME | SAFETY | COMFORT |
| 01 | EMPTY VEHICLE | 1 | 2 | |
| 02 | GRAIN | 2 | 1 | |
| 03 | VEGETABLES AND FRUITS | 1 | 2 | 1 |
| 04 | OTHER AGRICULTURAL PRODUCTS | 2 | | 1 |
| 05 | ANIMAL PRODUCTS | | 2 | 1 |
| 06 | AQUATIC PRODUCTS | 1 | 2 | |
| 07 | LUMBER | | 1 | |
| 08 | WOOD AND COAL | | 1 | |
| 09 | COAL | | 1 | |
| 10 | METALLIC ORES | | 1 | |
| 11 | GRAVEL, SAND, AND STONE MATERIAL | | 1 | |
| 12 | INDUSTRIAL NON-METAL | | 1 | |
| 13 | IRON AND STEEL | | 1 | |
| 14 | NON-FERROUS METAL | | 1 | |
| 15 | METAL PRODUCTS | | 1 | |
| 16 | MACHINERY | | 2 | 1 |
| 17 | CEMENT | | | 1 |
| 18 | OTHER CERAMIC PRODUCTS | | | 1 |
| 19 | VOLATILE OIL | | 1 | |
| 20 | OTHER PETROLEUM AND PETROLEUM PRODUCTS | | 1 | |
| 21 | COAL PRODUCTS | | | 1 |
| 22 | CHEMICAL PRODUCTS | | | 1 |
| 23 | CHEMICAL FERTILIZER | | | 1 |
| 24 | DYE COMPOUND, PAINT, AND OTHER CHEMICAL INDUSTRIAL PRODUCTS | | | 1 |
| 25 | PAPER AND PULP | 1 | | |
| 26 | TEXTILE INDUSTRY PRODUCTS | | 1 | |
| 27 | FOOD INDUSTRY PRODUCTS | | 1 | |
| 28 | DAILY COMMODITIES | | | 2 |
| 29 | RUBBER PRODUCTS, WOOD PRODUCTS, AND OTHER MANUFACTURING INDUSTRIAL PRODUCTS | | 1 | |
| 30 | IRON SCRAPS | | 1 | |
| 31 | OTHER GARBAGE | | 1 | |
| 32 | FEEDING STUFFS AND FERTILIZERS OF ANIMAL OR PLANT ORIGIN | 1 | | 2 |
| 33 | WASTE | | 1 | |
| 34 | TRANSPORTATION CONTAINER | | 1 | |
| 35 | ASSORTED GOODS | 1 | | |
| 36 | SOMETHING UNCLASSIFIABLE | | 1 | |
| 90 | PASSENGERS | 3 | 2 | 1 |
| 99 | UNCLEAR | | 1 | |

FIG. 10

| ROUTE ID | NO | PASSED-THROUGH ROAD | POINT NAME | LOCATION | TRAVELING TIME | ASSUMED DEGREE OF CONGESTION | SOJOURN TIME | ... |
|---|---|---|---|---|---|---|---|---|
| Z1-01234567 | 1 | NATIONAL HIGHWAY α1 | S1 | XXXXX | 4:00 pm | | | ... |
| Z1-01234567 | 2 | NATIONAL HIGHWAY α1 | α11 | XXXXX | | | | ... |
| Z1-01234567 | 3 | NATIONAL HIGHWAY α1 | α12 | XXXXX | | | | ... |
| Z1-01234567 | 4 | EXPRESSWAY α2 | INTERCHANGE α21 | XXXXX | 7:00 pm | | | ... |
| Z1-01234567 | 5 | EXPRESSWAY α2 | SA α21 | XXXXX | 8:00 pm | 50 | 0:30 | ... |
| ... | | | | | | | | |

FIG. 11

| ID | ROUTE ID | ... |
|---|---|---|
| 1234567 | Z1-01234567 | ... |
| ⋮ | | |

FIG. 16

| CANDIDATE OPERATION ROUTE | USAGE RATIO (%) | DISTANCE (km) | DETERIORATED DISTANCE (km) | PERIOD OF TIME TAKEN TO TRAVEL (H) | NUMBER OF REST FACILITIES ◉ | NUMBER OF SUDDEN-BRAKING FREQUENT OCCURRENCE POINTS ✕ |
|---|---|---|---|---|---|---|
| Z1 | 30 | 870 | 20 | 14 | 3 | 5 |
| Z2 | 25 | 930 | 30 | 16 | 4 | 1 |
| Z3 | 20 | 980 | 0 | 17 | 3 | 3 |
| Z4 | 15 | 990 | 0 | 18 | - | - |

OTHER ROUTES CORRESPOND TO REMAINING 10% AND EACH HAVE RATIO LESS THAN 5%

INCREASE IN PERIOD OF TIME TAKEN TO TRAVEL EXCEEDS 25%, COMPARED WITH ROUTE ALONG WHICH IT TAKES SHORTEST PERIOD OF TIME TO TRAVEL, AND IS REJECTED

FIG. 18

```
ROUTE Z11
O: AOBA-KU, SENDAI CITY AT 4:00 pm ON TUESDAY
  ┌NATIONAL            ×   POINT α11
  │HIGHWAY α1
  └                    ×   POINT α12          ARRIVAL TIME (SOJOURN TIME)
  ┌ENTRANCE:           ◉   PASS THROUGH              ↓
  │INTERCHANGE α21         AT 7:00 pm
  │EXPRESSWAY α2       ☉   SA α22           8:00 pm (30 MINUTES) DEGREE OF
  │                                              CONGESTION OF 50%
  │                    ⊘   VICINITY OF α23
  │EXIT: INTERCHANGE   ◉   PASS THROUGH
  └α24                     AT 11:00 pm
                       ☉   ROADSIDE         0:00 am (30 MINUTES) DEGREE OF
  ┌                        STATION α31           CONGESTION OF 70%
  │PREFECTURAL ROAD    ×   POINT α32
  └α3
  ┌ENTRANCE:           ◉   PASS THROUGH
  │INTERCHANGE α41         AT 1:00 am
  │EXPRESSWAY α5       ⊘   VICINITY OF α42
  │                    ☉   PA α43           2:00 am (30 MINUTES) DEGREE OF
  │                                              CONGESTION OF 40%
  │EXIT: INTERCHANGE   ◉   PASS THROUGH AT
  └α44                     4:00 am
  ┌NATIONAL            ×   POINT α51
  │HIGHWAY α5
  └                    ×   POINT α52

D: CHUO-KU, OSAKA CITY AT 6:00 am ON WEDNESDAY
```

OPERATION SUPPORT METHOD AND OPERATION SUPPORT DEVICE

CROSS-REFERENCE TO RELATED APPLICATION

This application is based upon and claims the benefit of priority of the prior Japanese Patent Application No. 2016-031483, filed on Feb. 22, 2016, the entire contents of which are incorporated herein by reference.

FIELD

The embodiments discussed herein are related to a technology for supporting an operation of a vehicle.

BACKGROUND

In the past, operations of business-use vehicles such as a truck and a bus have been performed as follows. A request source that asks for an operation of a business-use vehicle provides, for an operation executor who operates the business-use vehicle, a departure point, an arrival point, a specified arrival date and time, an operation route, and so forth, thereby asking for the operation of the business-use vehicle, for example. Based on the request, the operation executor creates an operation plan that sets out an expressway to pass through, a service area for taking a rest, and so forth.

Related technologies are disclosed in, for example, Japanese Laid-open Patent Publication No. 2015-125611 and Japanese Laid-open Patent Publication No. 2015-75859.

SUMMARY

According to an aspect of the invention, a method includes receiving an input of a departure point, an arrival point, and a desired arrival time of a specific vehicle to be operated, extracting, from a plurality of route information, a part of route information corresponding to routes that departed from or passed through around the departure point, and arrived at or passed through around the arrival point within a certain time range of the desired arrival time, the plurality of route information being acquired from a plurality of computers which have moved with vehicles, and including positions of the vehicles at various times, classifying the part of route information into a plurality of route groups by comparing each other, counting a number of route information classified in each route groups, calculating, for each route groups, a ratio of the number of route information classified in each route groups to total number of the part of route information, and outputting operation information based on the ratio, the operation information including at least one of specific route as candidates for the specific vehicle.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a data configuration of monitoring device information;

FIG. 5 is a diagram illustrating an example of a data configuration of operation achievement information;

FIG. 6 is a diagram illustrating an example of a data configuration of braking point information;

FIG. 7 is a diagram illustrating an example of a data configuration of deteriorated section information;

FIG. 8 is a diagram illustrating an example of a data configuration of rest facility information;

FIG. 9 is a diagram illustrating an example of a data configuration of priority order information;

FIG. 10 is a diagram illustrating an example of a data configuration of operation route information;

FIG. 11 is a diagram illustrating an example of a data configuration of specified route information;

FIG. 16 is a diagram illustrating an example of an identification result of individual extracted routes;

FIG. 18 is a diagram illustrating an example of path information displayed on an operation screen;

DESCRIPTION OF EMBODIMENTS

Since a request source does not understand an actual road situation, it is difficult to find an appropriate operation route. In some cases, the request source turns out to specify a route difficult for a truck or a bus to travel along, for example. In addition, since not understanding a congestion state of a road, the request source turns out to specify a congested route in some cases.

In one aspect, an object of the technology disclosed in embodiments is to present an appropriate operation route.

Hereinafter, embodiments of an operation support program, an operation support method, and an operation support device according to the present technology will be described in detail, based on drawings. Note that the present embodiments do not limit the disclosed technology. In addition, embodiments illustrated below may be arbitrarily combined in so far as they are consistent. In what follows, a case where a moving object is an vehicle will be described as an example.

First Embodiment

Figure 1:
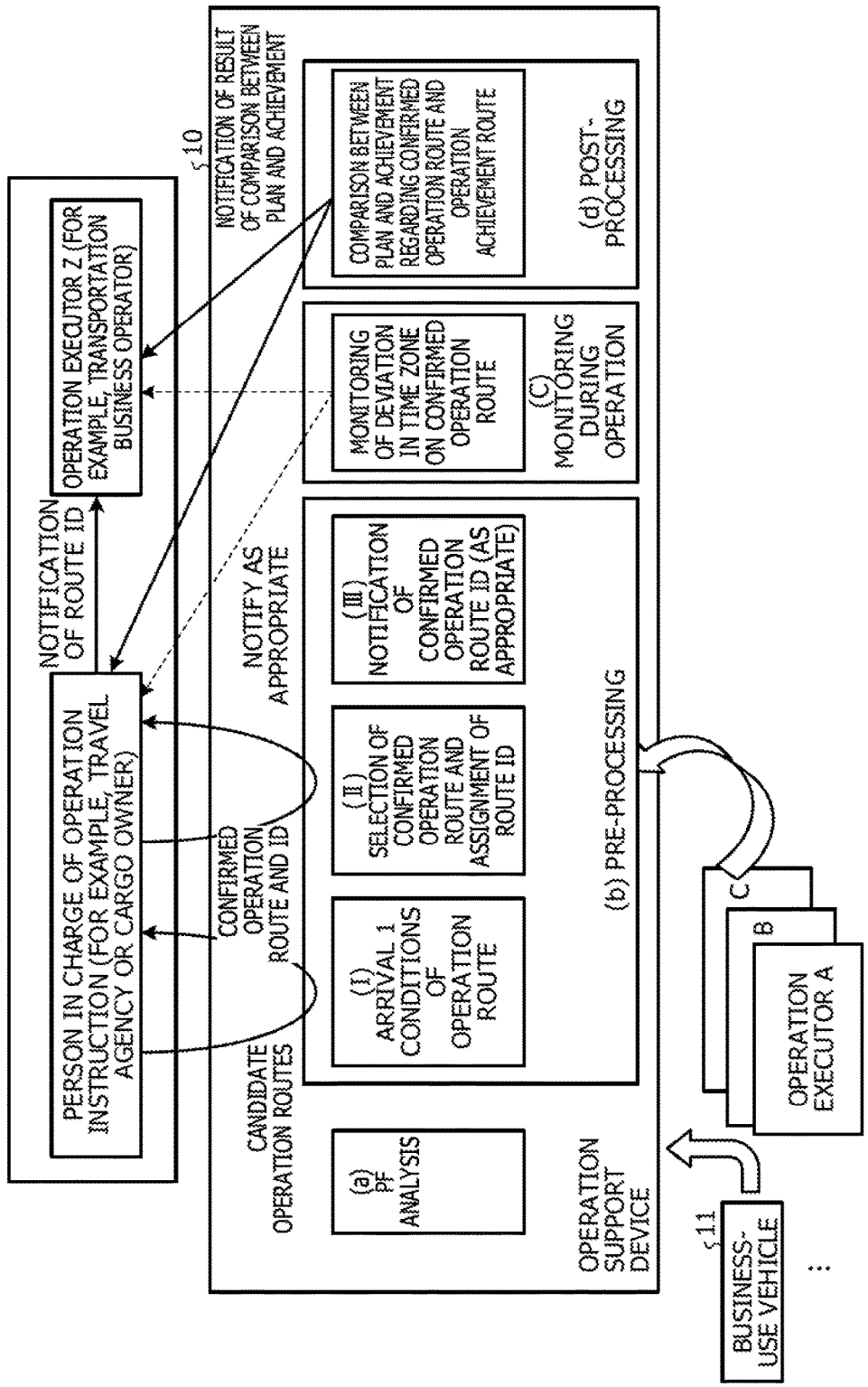
FIG. 1 is an explanatory diagram for explaining an example of an operation support.

First, an example related to an operation support according to a first embodiment will be described. FIG. 1 is an explanatory diagram for explaining an example of an operation support. In an operation support device 10, a platform (PF) for supporting an operation of a vehicle is created.

Business-use vehicles 11 such as, for example, a truck, a bus, and a cab are each equipped with an operation monitoring device such as a digital tachograph, thereby detecting various types of information such as a current location, a time, the speed of a corresponding one of the vehicles, acceleration rates in three axial directions (front-back, up-down, and left-right) of the corresponding one of the vehicles. In addition, the business-use vehicles 11 each transmit, to the operation support device 10, the detected various types of information as probe information.

Based on the various types of information, the operation support device 10 provides various types of service for supporting operations of vehicles. Based on the probe information collected from the business-use vehicles 11, the operation support device 10 provides operation management services for vehicles, for example. By using the operation management services, operation executors A to C who operate the business-use vehicles 11 manage respective vehicles operated by themselves.

In addition, the operation support device 10 analyzes the probe information collected from the business-use vehicles 11 on the platform ((a) in FIG. 1) and identifies an occurrence point of sudden braking, thereby providing a service for providing information of a point of a frequent occurrence of sudden braking, for example.

In addition, the operation support device 10 analyzes, on the platform, the probe information collected from the business-use vehicles 11, smartphones mounted in general-purpose vehicles, and so forth ((a) in FIG. 1), thereby providing a road patrol service for detecting a deterioration state of a road, for example.

In addition, the operation support device 10 provides a service for supporting drawing up of operation routes of the business-use vehicles 11 such as a truck and bus, for example. In a request source such as a travel agency or a cargo owner, which asks for an operation of one of the business-use vehicles 11, a person in charge of an operation instruction draws up an operation route by using a service provided by the operation support device 10. The operation support device 10 receives inputting of conditions of the operation route such as a departure point, an arrival point, and an arrival time, for example. The person in charge of an operation instruction inputs, to the operation support device 10, the conditions of the operation route such as a departure point, an arrival point, and an arrival time ((I) in (b) in FIG. 1). The operation support device 10 analyzes the probe information on the platform ((a) FIG. 1) and extracts, from routes on which operations are previously performed, routes satisfying the received conditions. The operation support device 10 presents the extracted routes as candidate operation routes ((I) in (b) in FIG. 1). The candidate operation routes are routes obtained by selecting some optimum routes by performing platform analysis, based on input pieces of information, such as the departure point, the arrival point, and the arrival time.

In this way, from among routes on which operations are previously performed, the operation support device 10 presents, as the candidate operation routes, routes traveled along at a frequency greater than or equal to a predetermined number of times. Based on past experience and so forth, a driver who drives one of the business-use vehicles 11 understands an actual road situation and usually avoids a route difficult to travel along. Therefore, routes traveled along at a frequency greater than or equal to the predetermined number of times are appropriate operation routes that avoid inappropriate routes such as a route difficult to travel along and a congested route. Therefore, the operation support device 10 is able to present appropriate operation routes.

From among the presented candidate operation route, the person in charge of an operation instruction selects a confirmed operation route on which an operation is to be performed ((II) in (b) in FIG. 1). The confirmed operation route is a route selected from among the candidate operation routes by the person in charge of an operation instruction. The operation support device 10 assigns a new route identification (ID) to the selected confirmed operation route and gives notice of the assigned route ID ((III) in (b) in FIG. 1).

The person in charge of an operation instruction notifies, of the route ID, an operation executor Z, such as, for example, a transportation enterprise or a bus company, which operates one of the business-use vehicles 11. The operation executor Z accesses the operation support device 10 and inputs therein the route ID, thereby acquiring information of the confirmed operation route. Note that the operation support device 10 may notify the operation executor Z of the information of the confirmed operation route. The operation support device 10 may receive inputting of information of a destination of a notice to the operation executor Z, such as a mail address of the operation executor Z, and may transmit the information of the confirmed operation route to the received notice destination. In addition, the person in charge of an operation instruction may notify an operation executor of the information of the confirmed operation route.

The operation executor determines one of the business-use vehicles 11, which is to travel along the confirmed operation route, and creates an operation plan by using the information of the confirmed operation route, thereby delivering the operation plan to a driver of the corresponding one of the business-use vehicles 11.

Here, since traditionally the person in charge of an operation instruction does not understand an actual road situation, it is difficult to find an appropriate operation route. However, according to the present embodiment, the person in charge of an operation instruction is able to find the appropriate operation route by using the operation support device 10. For this reason, the operation support device 10 is able to reduce the trouble of the operation executor Z in finding an operation route. In addition, the operation support device 10 is able to cause the person in charge of an operation instruction, the operation executor Z, and the driver of the corresponding one of the business-use vehicles 11 to share information of the same operation route.

The operation executor inputs, to the operation support device 10, an ID of the corresponding one of the business-use vehicles 11 which is to travel along the confirmed operation route while associating the ID of the corresponding one of the business-use vehicles 11 with the route ID of the confirmed operation route.

Based on the probe information collected from the corresponding one of the business-use vehicles 11, the operation support device 10 monitors, during an operation, whether the corresponding one of the business-use vehicles 11 travels along the confirmed operation route ((c) in FIG. 1). In response to a request, the operation support device 10 notifies the person in charge of an operation instruction or the operation executor Z of a monitoring result.

In addition, based on the probe information from the corresponding one of the business-use vehicles 11, the operation support device 10 identifies an operation achievement route. The operation achievement route is a route actually used for an operation. The operation support device 10 compares the confirmed operation route and the operation achievement route with each other, thereby comparing a plan and an achievement with each other, and notifies the person in charge of an operation instruction or the operation executor Z of a result of a comparison between the plan and the achievement ((d) in FIG. 1).

For this reason, based on the result of a comparison between the plan and the achievement, the operation executor Z is able to understand whether or not there is a problem in the actual operation. In addition, the operation support device 10 is able to support creation of a daily operation report.

System Configuration

Figure 2:
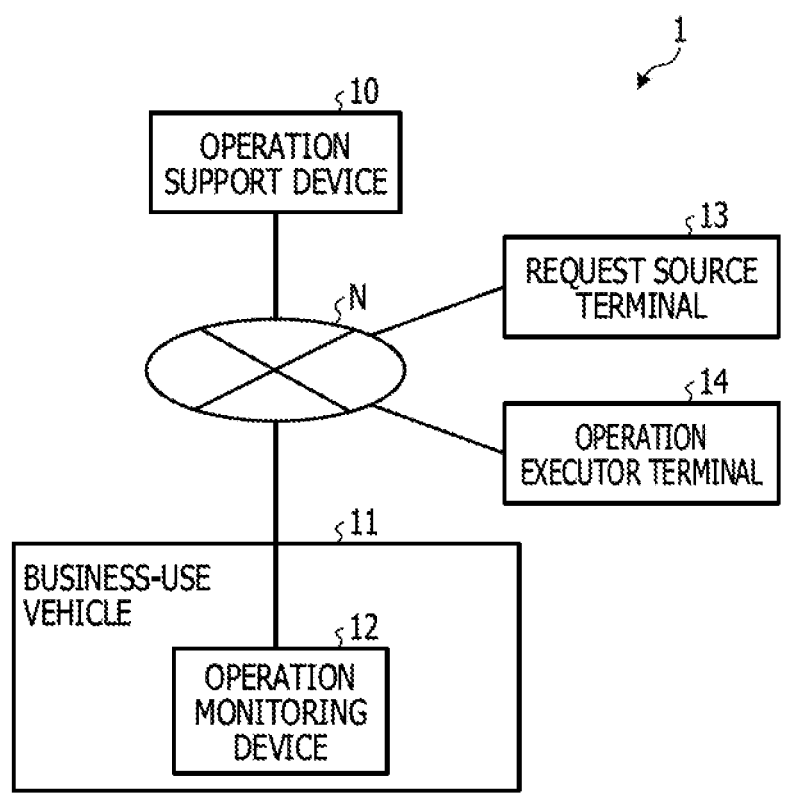
FIG. 2 is a diagram illustrating are example of system configuration.

Next, an example of a system for realizing the operation support illustrated in FIG. 1 will be described. FIG. 2 is a diagram illustrating an example of a system configuration. As illustrated in FIG. 2, a system 1 includes the operation support device 10, an operation monitoring device 12, a request source terminal 13, and an operation executor terminal 14. The operation support device 10, the operation monitoring device 12, the request source terminal 13, and the operation executor terminal 14 are connected to a network N so as to be able to perform communication with one another. As an embodiment of such a network N, regardless of whether wired or wireless, an arbitrary type of communication network such as a mobile communication network of mobile phones or the like, the Internet, a local area network (LAN), or a virtual private network (VPN) may be adopted.

The operation monitoring device 12 is a device that is mounted in, for example, a driver's seat in a vehicle and that monitors an operation of the vehicle in which the device is mounted. An operation executor who operates, for example, a truck or a bus attaches, to a corresponding one of the business-use vehicles 11, the operation monitoring device 12 such as a digital tachograph, thereby managing an operation of the vehicle. The operation monitoring device 12 is mounted in the corresponding one of the business-use vehicles 11. Note that a case where the number of the business-use vehicles 11 in each of which the operation monitoring device 12 is mounted is one is exemplified in the example of FIG. 2, there is no limitation to this, and the number of the operation monitoring devices 12 or the number of the business-use vehicles 11 may be an arbitrary number.

The operation support device 10 is a device that manages an operation of a corresponding one of the business-use vehicles 11, based on information collected from a corresponding one of the operation monitoring devices 12. In addition, based on information collected from the operation monitoring devices 12, the operation support device 10 supports creation of an operation route of the corresponding one of the business-use vehicles 11. The operation support device 10 is a computer such as, for example, a server computer. Note that while, in the present embodiment, a case where the operation support device 10 is defined as one computer will be described, the operation support device 10 may be implemented as a cloud based on computers. The operation support device 10 may be implemented for each of provided services or functions while being divided into computers, for example.

The request source terminal 13 is a terminal device such as a personal computer, placed in, a request source, such as, for example, a travel agency or a cargo owner, which asks for an operation of one of the business-use vehicles 11. The request source terminal 13 is used in a case where a person in charge of an operation instruction of a request source accesses the operation support device 10 and creates an operation route, for example.

The operation executor terminal 14 is a terminal device such as a personal computer, placed in an operation executor who operates one of the business-use vehicles 11, such as, for example, a truck or a bus. The operation executor terminal 14 is used in a case where an operation executor accesses the operation support device 10 and understands a confirmed operation route, for example.

Configuration of Operation Support Device

Figure 3:
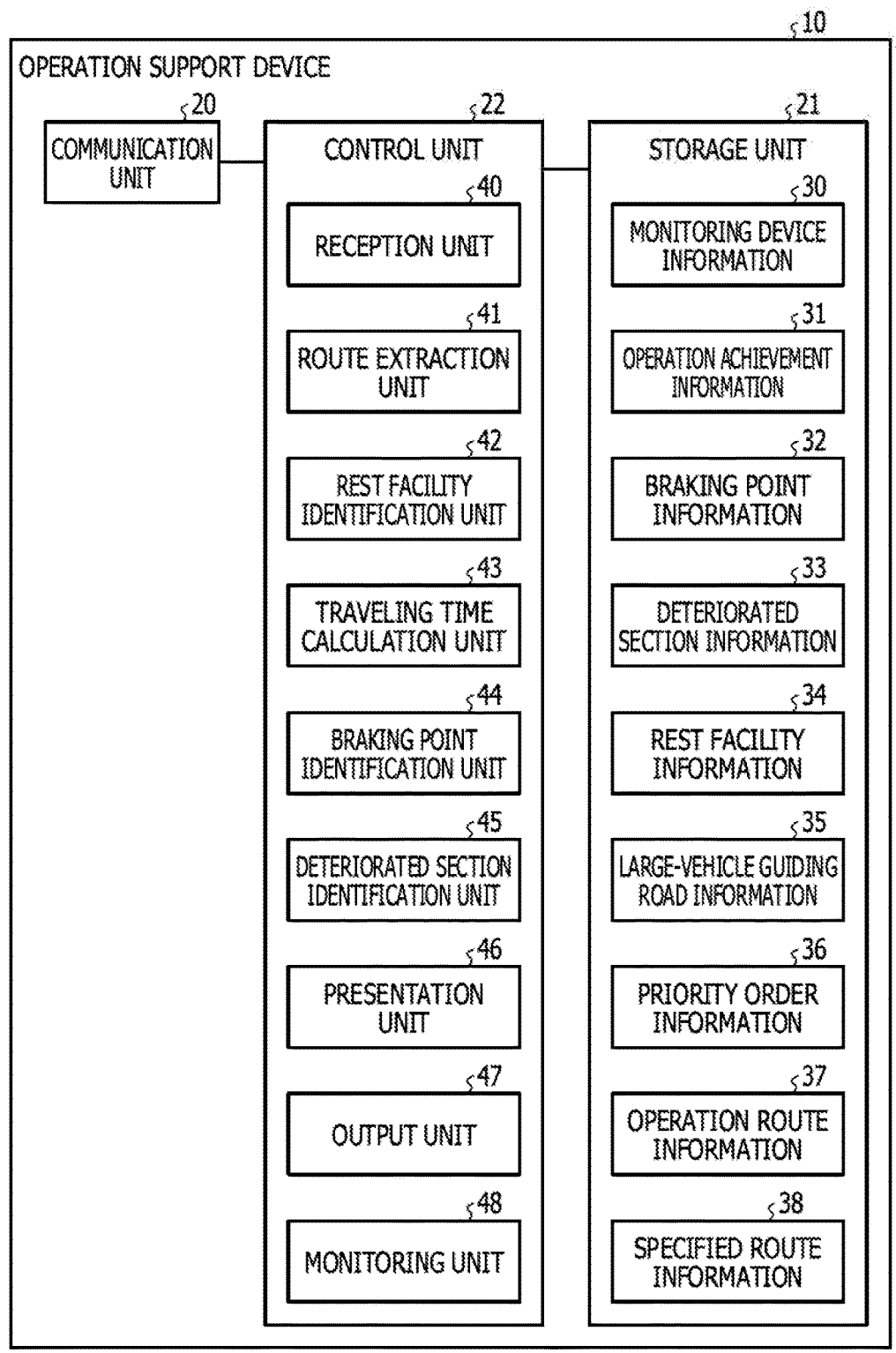
FIG. 3 is a diagram schematically illustrating a functional configuration of an operation support device.

Next, an configuration of the operation support device 10 will be described. FIG. 3 is a diagram schematically illustrating a functional configuration of an operation support device. The operation support device 10 illustrated in FIG. 3 includes a communication unit 20, a storage unit 21, and a control unit 22.

The communication unit 20 is a communication interface that performs wireless communication or wired communication with, for example, the network N.

The storage unit 21 is a storage device such as a hard disk, a solid state drive (SSD), or an optical disk. Note that the storage unit 21 may be a data-rewritable semiconductor memory such as a random access memory (RAM), a flash memory, or a non-volatile static random access memory (NVSRAM). The storage unit 21 stores therein an operating system (OS) to be executed by the control unit 22 and various types of program. Furthermore, the storage unit 21 stores therein various types of information. The storage unit 21 stores therein, for example, monitoring device information 30, operation achievement information 31, braking point information 32, deteriorated section information 33, rest facility information 34, large-vehicle guiding road information 35, priority order information 36, operation route information 37, and specified route information 38. Note that the storage unit 21 may store therein other various types of information. In order to authenticate, for example, users who log in from outside, the storage unit 21 stores therein user identifications (IDs) of the respective users and master information related to affiliations of the respective users.

The monitoring device information 30 is data in which various types of information related to the operation monitoring devices 12 and the business-use vehicles 11 in which the respective operation monitoring devices 12 are mounted are stored. FIG. 4 is a diagram illustrating an example of a data configuration of monitoring device information. As illustrated in FIG. 4, the monitoring device information 30 includes respective items of an ID, a vehicle total weight, a maximum carrying capacity, a vehicle body shape, and a riding capacity. Note that in addition to the above, the monitoring device information 30 may store therein various types of information such as information of the business-use vehicles 11 in which the respective operation monitoring devices 12 are mounted.

The item of the ID is an area to store therein identification information for identifying the operation monitoring devices 12. Unique IDs are assigned to the respective operation monitoring devices 12, as the identification information, for example. Note that each of the IDs may be an ID obtained by combining an identification code of an operation executor and an identification code of a corresponding one of the business-use vehicles 11. In addition, each of the IDs may be a manufacturing number of a corresponding one of the operation monitoring devices 12. In the item of the ID, IDs assigned to the respective operation monitoring devices 12 are stored. The item of the vehicle total weight is an area to store therein the vehicle total weights of the business-use vehicles 11 in which the respective operation monitoring devices 12 are mounted. The item of the maximum carrying capacity is an area to store therein maximum carrying capacities of the business-use vehicles 11 in which the respective operation monitoring devices 12 are mounted. The item of the vehicle body shape is an area to store therein codes indicating shapes of the business-use vehicles 11 in which the respective operation monitoring devices 12 are mounted. For the business-use vehicles 11, codes indicating shapes are defined for the respective shapes. In the item of the vehicle body shape, codes corresponding to shapes of the respective operation monitoring devices 12 are stored. The item of the riding capacity is an area to store therein riding capacities of the business-use vehicles 11 in which the respective operation monitoring devices 12 are mounted.

In the example of FIG. 4, the operation monitoring device 12 having the ID of "1234567" indicates that the vehicle total weight of the business-use vehicle 11 in which the relevant monitoring device 12 is mounted is "24940" kg, the maximum carrying capacity thereof is "13200" kg, the code of the vehicle body shape is "21", and the riding capacity thereof is "2" persons.

Returning to FIG. 3, the operation achievement information 31 is data in which various types of information related to operation achievements of the respective business-use vehicles 11, such as the pieces of probe information transmitted by the respective operation monitoring devices 12, are stored. FIG. 5 is a diagram illustrating an example of a data configuration of operation achievement information. As illustrated in FIG. 5, the operation achievement information 31 includes respective items of an ID, a date and time, a location, a speed, and an acceleration rate. Note that in addition to the above, the operation achievement information 31 may store therein various types of information. The operation achievement information 31 may store therein pieces of information such as, for example, the number of GPS satellites used for positioning, the number of revolutions of an engine, and an inter-vehicle distance.

The item of the ID is an area to store therein the IDs of the respective operation monitoring devices 12 that each transmit the probe information. The item of the date and time is an area to store therein dates and times at which various types of information such as locations and speeds are detected by the respective operation monitoring devices 12. The item of the location is an area to store therein location information indicating the locations of the business-use vehicles 11 detected by the respective operation monitoring devices 12. In the present embodiment, it is assumed that the location information is information indicating each of locations by using a latitude, a longitude, and so for based on a predetermined geodetic system such as the Japan geodetic system or a world geodetic system. Note that the location information may be other information as long as being able to identify locations. The location information may be a mesh code such as, for example, a one-dimensional mesh, a two-dimensional mesh, a three-dimensional mesh, or an area mesh, which separates a map, a code of a B zone of the road traffic census, or a map code. The item of the speed is an area to store therein the speeds of the business-use vehicles 11 detected by the respective operation monitoring devices 12. The item of the acceleration rate is an area to store therein acceleration rates in three axial directions (front-back, up-down, and left-right) of the business-use vehicles 11, detected by the respective operation monitoring devices 12.

In the example of FIG. 5, the business-use vehicle 11 in which the operation monitoring device 12 having the ID of "1234567" is mounted indicates that a location at 8:02 am on Jun. 1, 2015 is 35.XX north latitude and 139.XX east longitude and a speed is "40" km. In addition, the business-use vehicle 11 in which the operation monitoring device 12 having the ID of "1234567" is mounted indicates that an acceleration rate in a front-back direction is "2" m/s$^2$, an acceleration rate in an up-down direction is "0.5" m/s$^2$, and an acceleration rate in a left-right direction is "0" m/s$^2$.

Returning to FIG. 3, the braking point information 32 is data in which various types of information, related to points at which predetermined braking occurs, are stored. In the braking point information 32, locations at which acceleration rates occur in an anterior direction and the number of times the acceleration rates occur are stored for each of time zones, the acceleration rates being able to be regarded as sudden braking and being greater than or equal to a predetermined level. FIG. 6 is a diagram illustrating an example of a data configuration of braking point information. As illustrated in FIG. 6, the braking point information 32 includes respective items of a location and a time zone. The item of the time zone is divided into items for respective given periods of time. In the present embodiment, the item of the time zone is divided into items for respective hours. Note that the braking point information 32 may store therein various types of information in addition to the above.

The item of the location is an area to store therein location information indicating locations of braking points at which sudden braking occurs. In the present embodiment, it is assumed that the location information is information indicating each of locations by using a latitude, a longitude, and so for based on a predetermined geodetic system such as the Japan geodetic system or a world geodetic system. Note that the location information may be other information as long as being able to identify locations. The location information may be a mesh code, a code of a B zone, or a map code, for example. The item of the time zone is an area to store therein the number of times predetermined braking occurs in each of the time zones.

The example of FIG. 6 indicates that, at a location at 35.XX north latitude and 139.XX east longitude, sudden braking occurs once between 2:00 pm and 3:00 pm (from 2:00 pm to 2:59 pm), sudden braking occurs once between 3:00 pm and 4:00 pm (from 3:00 pm to 3:59 pm), and sudden braking occurs twice between 4:00 pm and 5:00 pm (from 4:00 pm to 4:59 pm).

Figure 7:
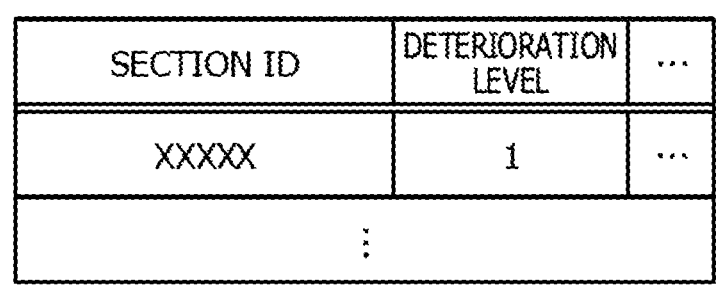

Returning to FIG. 3, the deteriorated section information 33 is data in which various types of information related to sections in which deteriorations of roads are detected are stored. In the deteriorated section information 33, information of road sections in each of which an acceleration rate, regarded as caving or a deterioration of a pavement surface and greater than or equal to a predetermined level, occurs in an up-down direction. FIG. 7 is a diagram illustrating an example of a data configuration of deteriorated section information. As illustrated in FIG. 7, the deteriorated section information 33 includes respective items of a section ID and a deterioration level. Note that the deteriorated section information 33 may store therein various types of information in addition to the above.

The item of the section ID is an area to store therein identification information for identifying sections of a road. As for a road, to each of predetermined sections of the road, a section ID is assigned as the identification information for identifying the relevant section. In the item of the section ID, section IDs indicating sections of a road are stored. Note that identification information for identifying sections may be other information as long as being able to identify sections. As the identification information for identifying sections, location information of start locations and end locations of respective sections may be used, for example. The item of the deterioration level is an area to store therein a result of evaluating the degree of a deterioration of a road, based on magnitudes of acceleration rates in an up-down direction.

The example of FIG. 7 indicates that, in a section having the section ID of "XXXXX", a deterioration level of a road is "1".

Returning to FIG. 3, the rest facility information 34 is data in which various types of information are stored, the various types of information being related to rest facilities at which the business-use vehicles 11 stop and in which drivers thereof are able to rest. FIG. 8 is a diagram illustrating an example of a data configuration of rest facility information. As illustrated in FIG. 8, the rest facility information 34 includes respective items of a facility ID, a name, a location, a type, and the number of vehicles capable of being parked. Note that in addition to the above, the rest facility information may store therein various types of information.

The item of the facility ID is an area to store therein identification information for identifying rest facilities. To the rest facilities, facility IDs are assigned as the identification information for identifying the respective rest facilities. In the item of the facility ID, the facility IDs assigned to the respective rest facilities are stored. The item of the name is an area to store therein names of the respective rest facilities. The item of the location is an area to store therein location information indicating locations of the respective rest facilities. The location information may be an arbitrary type of information as long as being able to identify locations of the respective rest facilities. The location information may be information indicating locations by using latitudes, longitudes, and so forth, for example, or may be a mesh code, a code of a B zone, or a map code, for example. The item of the type is an area to store therein information indicating types of rest facility. In the present embodiment, as the types, whether a rest facility is a service area (SA), a parking area (PA), or a roadside station is stored. Note that the rest facilities are not limited to the service area, the parking area, and the roadside station and may be arbitrary types as long as the business-use vehicles 11 stop thereat and drivers are able to rest therein. The rest facilities may include a convenience store at which a parking space in which the business-use vehicles 11 are able to be parked is provided, for example. The item of the number of vehicles capable of being parked is an area to store therein the number of vehicles capable of being parked in a parking space provided in a corresponding one of the rest facilities for the business-use vehicles 11.

In the example of FIG. 8, the facility ID of "0001" indicates that a facility is a "service area XX", a location is "XXXXX", a type is the "service area (SA)", and the number of vehicles capable of being parked is "80".

Returning to FIG. 3, the large-vehicle guiding road information 35 is data in which various types of information related to sections of a road to guide large vehicles are stored. To cope with aging of a road, a road along which special-purpose vehicles are desired to travel is specified as a section of a road to guide large vehicles. A law defines a condition that total weights of the special-purpose vehicles are greater than or equal to 20 t, for example. Expressways, state-controlled national highways, and roads, the roads being included regionally managed roads and connecting major, seaports, airports, and rail freight stations, are specified as sections of roads to guide the passage of large vehicles, for example. In the large-vehicle guiding road information 35, information of roads defined as sections of roads to guide large vehicles is stored.

The priority order information 36 is data in which various types of information related to priority orders of routes are stored. Here, while usually trucks travel along operation routes along which it takes a short period of time for the trucks to travel, desirable operation routes differ depending on merchandise items to be transported, in some cases. In a case of transporting, for example, precision machines or racehorses, operation routes, vibration from which is low, are desirable. In addition, as for buses, since passengers ride the buses, safer or more comfortable operation routes are desirable. In the priority order information 36, priority orders of operation routes are stored in accordance with merchandise items to be transported. FIG. 9 is a diagram illustrating an example of a data configuration of priority order information. As illustrated in FIG. 9, the priority order information 36 includes respective items of a code, a classification, and important points. The item of the important points is divided into respective items of a period of time, safety, and comfort. Note that the priority order information 36 may store therein various types of information in addition to the above.

The item of the code is an area to store therein codes indicating respective merchandise items. The item of the classification is an area to store therein transportation items corresponding to the respective codes. The item of the important points is an area to store therein a priority order of whether to attach importance to the period of time, the safety, or the comfort. The item of the period of time is an area to store therein the priority order of an operation route along which it takes a short period of time to travel. The item of the safety is an area to store therein the priority order of a safer operation route. The item of the comfort is an area to store therein the priority order of a more comfortable operation route.

In the example of FIG. 9, the code of "01" indicates that a vehicle is empty, the priority order of an operation route along which it takes a short period of time to travel is the first place, and the priority order of a safer operation route is the second place.

Returning to FIG. 3, the operation route information 37 is data in which various types of information related to a confirmed operation route are stored. FIG. 10 is a diagram illustrating an example of a data configuration of operation route information. As illustrated in FIG. 10, the operation route information 37 includes respective items of a route ID, a No., a passed-through road, a point name, a location, a traveling time, the assumed degree of congestion, and a sojourn time. Note that the operation route information 37 may store therein various types of information in addition to the above.

The item of the route ID is an area to store therein identification information for identifying operation routes. To the operation routes, route IDs are assigned as the identification information for identifying the respective operation routes. In the item of the route ID, the route IDs assigned to the respective operation routes are stored. The item of the No. is an area to store therein numbers indicating sequential orders of respective points along the operation routes. The item of the passed-through road is an area to store therein information of roads on which the points are located. The item of the point name is an area to store therein names of the points. The item of the location is an area to store therein location information indicating locations of the points. The location information may be an arbitrary type of information as long as being able to identify locations. The location information may be information indicating locations by using latitudes, longitudes, and so forth, for example, or may be a mesh code, a code of a B zone, or a map code, for example. The item of the traveling time is an area to store therein a predictive traveling time to travel through a corresponding one of the points at. In a case where the predictive traveling time is obtained, the obtained traveling time is stored in the item of the traveling time, and in a case where no predictive traveling time is obtained, the item of the traveling time is set empty. The item of the assumed degree of congestion is an area to store therein the assumed degree of congestion of a parking space provided at a point. The item of the sojourn time is an area to store therein an estimated sojourn time. In the present embodiment, an operation route will be obtained while being scheduled to rest in a rest facility. In a case where the degree of congestion of a parking space is obtained, the obtained degree of congestion of a parking space is stored in the item of the assumed degree of congestion, and in a case where the degree of congestion of a parking space is not obtained, the item of the assumed degree of congestion is set empty. In a case where an estimated sojourn time is defined, the defined estimated time is stored in the item of the sojourn time, and in a case where no estimated sojourn time is defined, the item of the sojourn time is set empty.

In the example of FIG. 10, an operation route having the route ID of "Z1-01234567" indicates that, as a No. "1", a predictive traveling time at a point that has the point name of "S1" and that is located on a "national highway α1" is "4:00 pm". In addition, it is indicated that a location of the point having the point name of "S1" is "XXXXX". In addition, the operation route having the route ID of "Z1-01234567" indicates that, as a No. "5", a predictive traveling time at a point that has the point name of a "service area (SA) α21" and that is located on an "expressway α2" is "8:00 pm". In addition, it is indicated that a location of the point having the point name of the "service area (SA) α21" is "XXXXX", the assumed degree of congestion thereof is "50%", and an estimated sojourn time thereof is 30 minutes.

Figure 11:
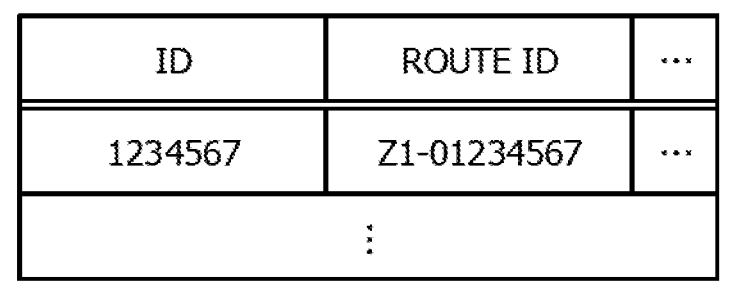

Returning to FIG. 3, the specified route information 38 is a data in which various types of information related to the business-use vehicles 11 to travel along operation routes are stored. FIG. 11 is a diagram illustrating an example of a data configuration of specified route information. As illustrated in FIG. 11, the specified route information 38 includes respective items of an ID and a route ID. Note that in addition to the above, the specified route information 38 may store therein various types of information.

The item of the ID is an area to store therein IDs of the operation monitoring devices 12 mounted in the respective business-use vehicles 11 scheduled to travel along the operation routes. The item of the route ID is an area to store therein route IDs of the operation routes scheduled to be traveled along.

The example of FIG. 11 indicates that the business-use vehicle 11 in which the operation monitoring device 12 having the ID of "1234567" is mounted is scheduled to travel along the operation route having the route ID of "Z1-01234567".

Returning to FIG. 3, the control unit 22 is a device to control the entire operation support device 10. As the control unit 22, an electronic circuit such as a central processing unit (CPU) or a micro processing unit (MPU) or an integrated circuit such as an application specific integrated circuit (ASIC) or a field programmable gate array (FPGA) may be adopted. The control unit 22 includes an internal memory to store therein programs that specify various types of processing procedure, and control data, and the control unit 22 performs various types of processing by using these. Various programs operate, thereby causing the control unit 22 to function as various processing units. The control unit 22 includes, for example, a reception unit 40, a route extraction unit 41, a rest facility identification unit 42, a traveling time calculation unit 43, a braking point identification unit 44, a deteriorated section identification unit 45, a presentation unit 46, an output unit 47, and a monitoring unit 48.

The reception unit 40 performs various types of reception. In response to requests from the request source terminal 13 and the operation executor terminal 14, the reception unit 40 transmits, to requestors, screen information of various screens such as an operation screen and an operation management screen, causes the requestors to display the screens, and receives inputting of various types of information from the screens, for example. The reception unit 40 receives inputting of conditions of an operation route from the operation screen of the request source terminal 13, for example.

Figure 12:
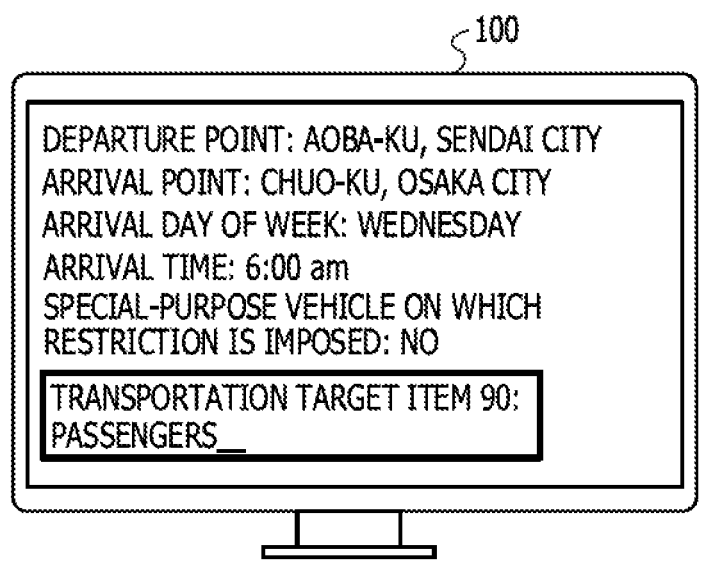
FIG. 12 is a diagram illustrating an example of an operation screen.

FIG. 12 is a diagram illustrating an example of an operation screen. An operation screen 100 is enabled to specify a departure point, an arrival point, an arrival day of the week, an arrival time, whether or not a corresponding one of the business-use vehicles 11 is a special-purpose vehicle, and a transportation target item. The reception unit 40 receives, from the operation screen 100, the specifications of a departure point, an arrival point, an arrival day of the week, an arrival time, whether or not a corresponding one of the business-use vehicles 11 is a special-purpose vehicle, and a transportation target item.

Figure 13:
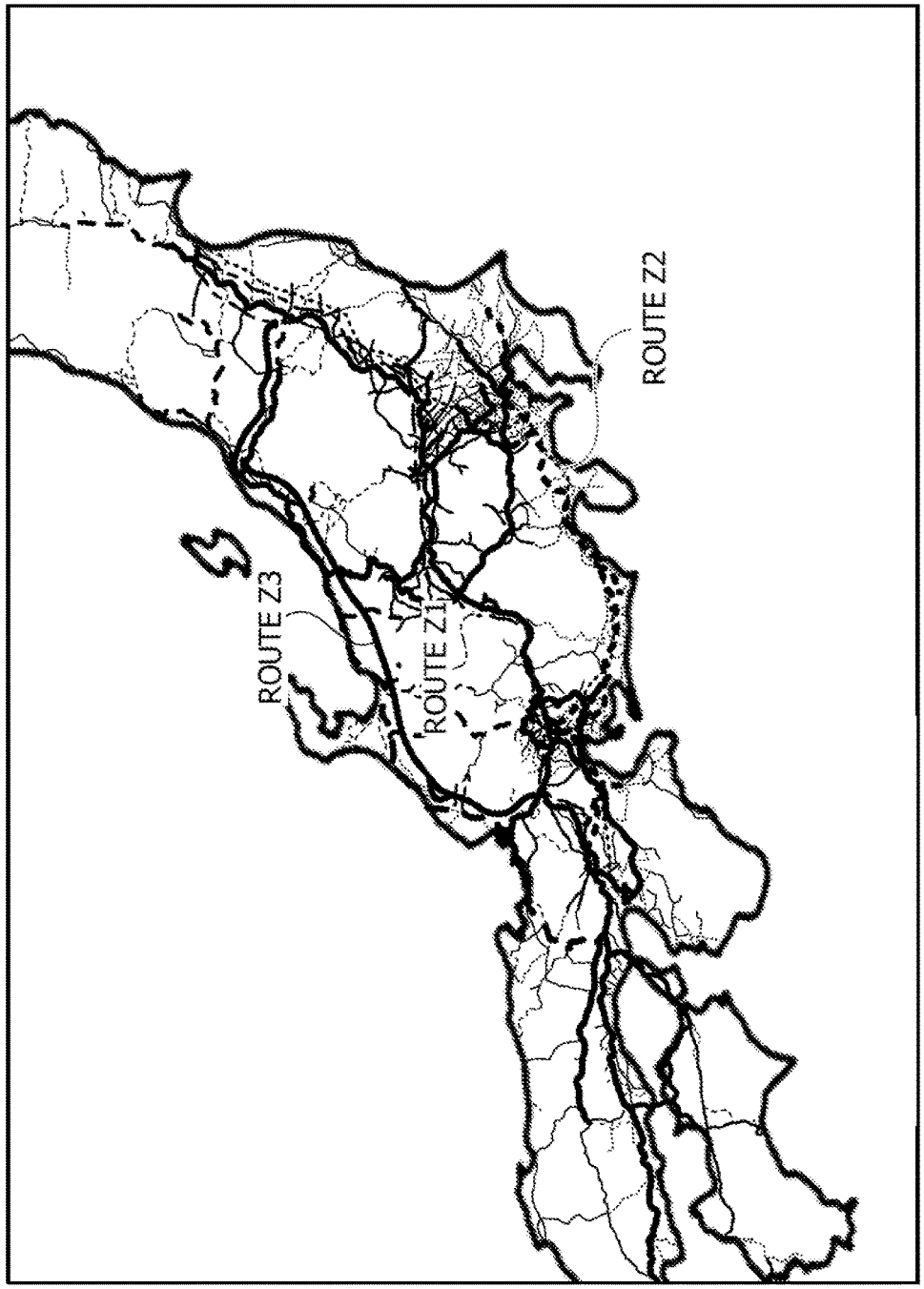
FIG. 13 is a diagram illustrating examples of routes.

The route extraction unit 41 extracts, from the operation achievement information 31, routes satisfying the received conditions. The route extraction unit 41 references the storage unit 21 and extracts, from the operation achievement information 31, achievement information of operations, obtained by departing from or passing through a surrounding area of a received departure place and by arriving at or passing through an arrival place within a predetermined time range of the received arrival time on the arrival day of the week, for example. The predetermined time range is set to a time period within which a traffic situation is able to be regarded as a similar situation, for example. It is assumed that the predetermined time range is a time period of 30 minutes before and after the arrival time, for example. The route extraction unit 41 extracts, from the operation achievement information 31, routes each obtained by arriving at or passing through the arrival point within the time period of 30 minutes before and after the arrival time on the arrival day of the week and by traveling therealong from the departure point to the arrival point at a frequency greater than or equal to a predetermined number of times, for example. Note that routes may be extracted while regarding neighbor ranges of the departure point and the arrival point as respective points identical thereto. The route extraction unit 41 may extract routes each obtained by arriving at or passing through a B zone containing the arrival point and by traveling therealong from the B zone containing the departure point to a B zone containing the arrival point at a frequency greater than or equal to a predetermined number of times, for example. The route extraction unit 41 classifies the extracted routes into routes of respective identical paths, thereby counting the number of times traveling therealong. The route extraction unit 41 calculates a ratio of the number of times traveling along each of the routes to the number of times traveling along all the extracted routes. The route extraction unit 41 extracts routes for each of which a corresponding one of the calculated ratios is greater than or equal to a predetermined ratio. The predetermined ratio is set to a ratio able to exclude an irregular route, for example. It is assumed that the predetermined ratio is, for example, 5%. Note that the route extraction unit 41 may extract a route for which the number of times traveling therealong is greater than or equal to a given number of times (for example, five). For this reason, routes usually used to travel from the departure point to the arrival point are extracted. FIG. 13 is a diagram illustrating examples of routes. FIG. 13 is a diagram illustrating examples of routes extracted while defining Aoba-ku, Sendai City as the departure point and defining Chuo-ku, Osaka City as the arrival point. In the example of FIG. 13, a route A routed through Hokuriku Expressway, a route B routed through Chuo Expressway, and a route C routed through Tomei Expressway are extracted.

For each of the extracted routes, the rest facility identification unit 42 identifies rest facilities for each of which a period of time taken to travel along the relevant extracted route does not exceed a predetermined period of time. In view of safety, a period of time during which a driver is able to continuously drive is regulated. One travel is regulated so as to fall within four hours, for example. It is assumed that the predetermined period of time is, for example, four hours. For each of the extracted routes, the rest facility identification unit 42 sequentially identifies, along the relevant route, the farthest rest facility in a range within which a traveling period of time from an arrival point side does not exceed four hours. As for the traveling period of time, a traffic jam situation of a road to travel along may be considered. A traveling period of time obtained by previously traveling along the same road in the same time zone on the same day of the week may be obtained from the operation achievement information 31, thereby obtaining the traffic jam situation, based on a comparison with a standard traveling period of time. In addition, the traffic jam situation may be acquired from an external server that provides traffic jam situations. In addition, as the traveling period of time, the average of traveling periods of time obtained by previously traveling along the same road in the same time zone on the same day of the week may be used.

Figure 14:
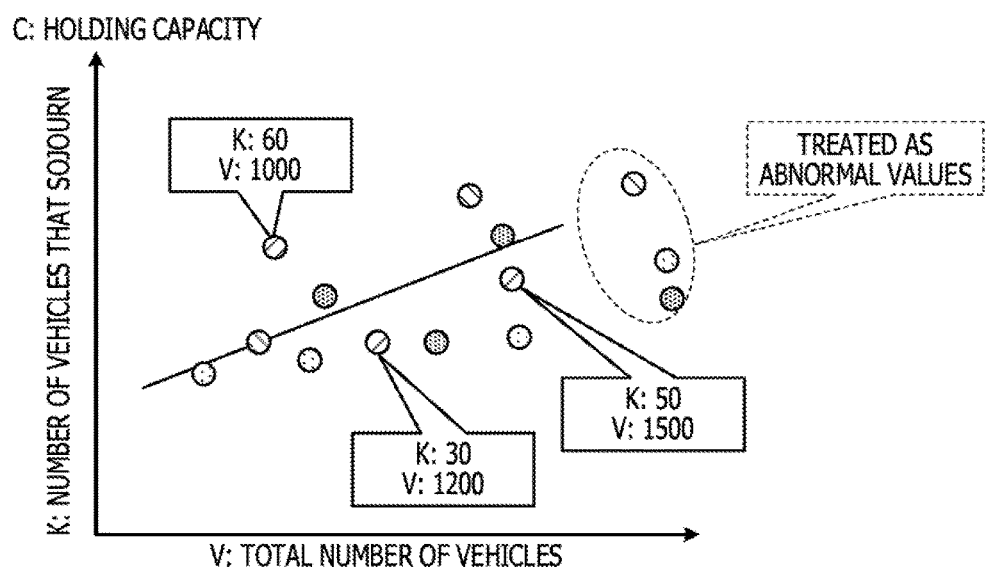
FIG. 14 is a diagram illustrating an example of a distribution of the total number of vehicles that pass by a rest facility for each month and each day of the week and the number of vehicles that sojourn in the relevant rest facility.

The rest facility identification unit 42 sequentially estimates the degrees of congestion of parking spaces of the identified rest facilities, starting from the arrival point side. For each month, each day of the week, and each time, the rest facility identification unit 42 obtains the total number of vehicles that pass by a rest facility, and the number of vehicles that sojourn in the rest facility more than 10 minutes, for example. For each month and each day of the week, the rest facility identification unit 42 obtains the total number V of vehicles that pass by a rest facility within one hour before and after an estimated time of traveling through the relevant rest facility, and the number K of vehicles that sojourn in the relevant rest facility more than 10 minutes, for example. In addition, for each month and each day of the week, the rest facility identification unit 42 obtains a distribution of the total number V of vehicles and the number K of vehicles that sojourn. FIG. 14 is a diagram illustrating an example of a distribution of the total number of vehicles that pass by a rest facility for each month and each day of the week and the number of vehicles that sojourn in the relevant rest facility. The rest facility identification unit 42 excludes, as abnormal values, a predetermined number of pieces of data having the low degrees of dispersion in a distribution. The rest facility identification unit 42 excludes, as abnormal values, three cases, starting from a maximum value of "V", for example. In the example of FIG. 14, three cases are excluded as abnormal values in decreasing order of "V". The rest facility identification unit 42 obtains the average of the numbers K of vehicles for respective months and days of the week and divides the average by the number C of vehicles capable of being parked in a rest facility, thereby obtaining the degree of congestion. The rest facility identification unit 42 calculates the degree of congestion from, for example, the following Expression (1).

$$\text{Degree of Congestion} = \{\Sigma \text{ Number } K \text{ of Vehicles}/ \text{Number of Cases}\}/C \quad (1)$$

Note that the rest facility identification unit 42 may obtain the degree of congestion from the average of the numbers K of vehicles for a month in which traveling is scheduled. It is assumed that a month in which traveling is scheduled is January and the number C of vehicles capable of being parked in a rest facility is 80, for example. In the example of FIG. 14, the numbers K of vehicles in January are 60, 30, and 50. In this case, the rest facility identification unit 42 calculates the degree of congestion as $\{(60+50+30)/3\}/80=58\%$.

The rest facility identification unit 42 determines whether the degree of congestion of a parking space of an identified rest facility exceeds a predetermined threshold value (for example, 80%). In a case where the degree of congestion of the parking space of the identified rest facility does not exceed the predetermined threshold value, the rest facility identification unit 42 identifies the identified rest facility as a rest point of a route. On the other hand, in a case where the degree of congestion of the parking space of the identified rest facility exceeds the predetermined threshold value, the rest facility identification unit 42 calculates the degree of congestion of a rest facility that is immediately adjacent on the arrival point side along the route and for which a traveling period of time is shorter than the identified rest facility. In addition, the rest facility identification unit 42 determines whether the degree of congestion of a parking space of the adjacent rest facility exceeds the predetermined threshold value. The rest facility identification unit 42 repeats searching for a rest point of the route until a rest facility for which the degree of congestion does not exceed the predetermined threshold value is identified. In a case where a rest facility to be a rest point is identified, the rest facility identification unit 42 repeats identifying, along the route, a rest facility to be a next rest point, for which a traveling period of time from the previous rest facility to be a rest point does not exceed the predetermined period of time, thereby identifying rest points along the route. Note that, for each of the extracted routes, the rest facility identification unit 42 may identify rest points along the relevant route, starting from a departure point side.

For each of the extracted routes, the traveling time calculation unit 43 calculates traveling times along the relevant route. By adding predetermined rest periods of time (for example, 30 minutes) in rest facilities identified as rest points, the traveling time calculation unit 43 calculates traveling times at predetermined points along the corresponding one of the extracted routes, for example. It is assumed that the predetermined points are points to serve as points of transportation in an operation such as, for example, interchanges and junctions of expressways and rest facilities identified as rest points. As for each of rest facilities identified as rest points, the traveling time calculation unit 43 calculates, as a traveling time, an estimated departure time after the elapse of a rest period of time since an estimated time of arrival at the relevant rest facility. For each of the extracted routes, the traveling time calculation unit 43 calculates traveling times along the relevant route and calculates a period of time taken to depart from a departure point and to arrive at an arrival point.

For each of the extracted routes, the braking point identification unit 44 identifies, from the braking point information 32, a point on the relevant route, at which the frequency of occurrence of predetermined braking is greater than or equal to a predetermined level. For each of the extracted routes, the braking point identification unit 44 identifies, from the braking point information 32, braking points located on the relevant route and reads the frequencies of occurrence of braking in respective time zones of passing through the braking points, thereby identifying, as a sudden-braking frequent occurrence point, a point at which the frequency of occurrence is greater than or equal to a predetermined level, for example. Note that the frequency of occurrence of braking may be the sum thereof in all time zones.

For each of the extracted routes, the deteriorated section identification unit 45 identifies, from the deteriorated section information 33, a section in which a deterioration of a road is greater than or equal to a predetermined level on the relevant route. For each of the extracted routes, the deteriorated section identification unit 45 reads, from the deteriorated section information 33, deterioration levels of respective sections located on the relevant route and identifies, as a deteriorated-road section, a section in which a deterioration level thereof is greater than or equal to a predetermined level, for example.

As for each of the extracted routes, based on the rest facility identification unit 42, the braking point identification unit 44, and the deteriorated section identification unit 45, rest facilities to be rest points, sudden-braking frequent occurrence points, and deteriorated-road sections are identified.

Figure 15:
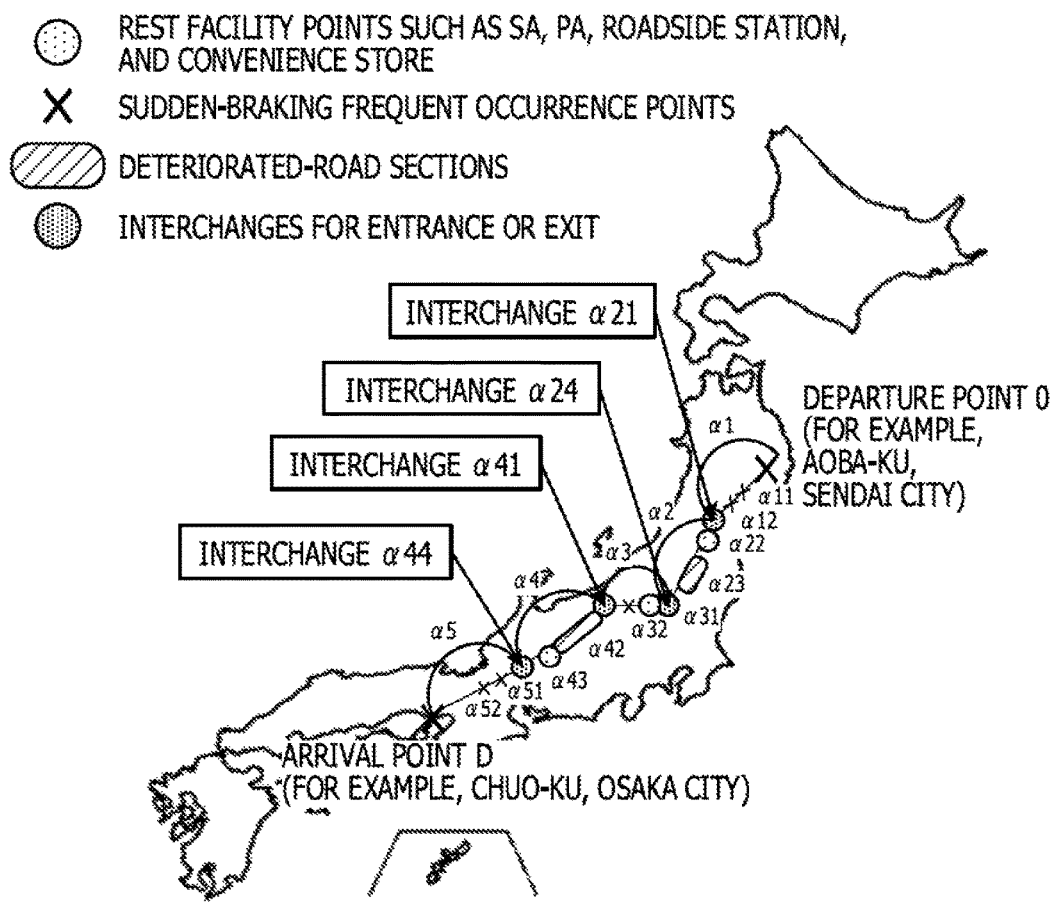
FIG. 15 is a diagram illustrating an example of a route.

FIG. 15 is a diagram illustrating an example of a route. The example of FIG. 15 illustrates a route on which Aoba-ku, Sendai City is a departure point and Chuo-ku, Osaka City is an arrival point. On the route in FIG. 15, a vehicle travels along a road α1 from the departure point, passes through an interchange α21, travels along a road α2, passes through an interchange α24, travels along a road α3, passes through an interchange α41, travels along a road α4, passes through an interchange α44, travels along a road α5, and arrives at the arrival point. In addition, on the route in FIG. 15, rest facilities at α22, α31, and α43 are illustrated as rest points. In addition, on the route in FIG. 15, α11 and α12 in the road α1, α32 in the road α3, and α51 and α52 in the road α5 are illustrated as sudden-braking frequent occurrence points. In addition, on the route in FIG. 15, α23 in the road α2 and α42 in the road α4 are illustrated as deteriorated-road sections.

The presentation unit 46 presents the extracted routes. In a case where routes are extracted, the presentation unit 46 presents, as the shortest route, a route on which a period of time taken to travel from a departure point and to arrive at an arrival point is the shortest. In addition, from among routes on each of which an increase in a period of time taken to travel therealong falls within a predetermined level, compared with a period of time taken to travel along the shortest route, the presentation unit 46 presents, as a safe route, a route having a minimum number of sudden-braking frequent occurrence points and having a greater number of rest facilities. In addition, from among the routes on each of which an increase in a period of time taken to travel therealong falls within a predetermined level, compared with the period of time taken to travel along the shortest route, the presentation unit 46 presents, as a comfortable route, a route having the shortest section in which a deterioration of a road is greater than or equal to a predetermined level and having a smaller number of sudden-braking frequent occurrence points. The presentation unit 46 calculates ratios of increases in periods of time taken to travel along the respective other extracted routes to the period of time taken to travel along the shortest route, for example. From among routes for each of which a ratio of an increase in a period of time taken to travel therealong falls within a predetermined ratio, the presentation unit 46 presents a safe route and a comfortable route. The predetermined ratio is set to a ratio to permit an increase in a period of time taken to travel along another route, compared with the shortest route, for example. It is assumed that the predetermined ratio is, for example, 25%. Note that, from among routes on each of which an increase in a period of time taken to travel therealong falls within a given period of time (for example, three hours), compared with the period of time taken to travel along the shortest route, the presentation unit 46 may present a safe route and a comfortable route.

FIG. 16 is a diagram illustrating an example of an identification result of individual extracted routes. In the example of FIG. 16, routes Z1 to Z4 are extracted and are illustrated as candidate operation routes. In the example of FIG. 16, for each of the routes Z1 to Z4, a ratio of the number of times traveling therealong is illustrated as a usage ratio. A route having a usage ratio less than 5% is not extracted. Therefore, in the example of FIG. 16, the sum of the usage ratios is not 100%. Since being a route having a usage ratio less than 5%, each of individual routes included in remaining 10% of usage ratios is not indicated. In addition, in the example of FIG. 16, for each of the routes Z1 to Z4, a distance between a departure point and an arrival point, a distance of a deteriorated section, a period of time taken to travel therealong, the number of rest facilities defined as rest points, and the number of sudden-braking frequent occurrence points are illustrated. In the example of FIG. 16, a period of time taken to travel along the route Z1 is the shortest. Therefore, the route Z1 serves as the shortest route. In addition, for each of the routes Z2 and Z3, an increase in a period of time taken to travel therealong is less than or equal to 25% of the period of time taken to travel along the route Z1. On the other hand, for the route Z4, an increase in a period of time taken to travel therealong is greater than or equal to 25% of an increase in the period of time taken to travel along the route Z1. Therefore, a safe route and a comfortable route are presented from among the routes Z2 and Z3. In the example of FIG. 16, the route Z2 has the number of sudden-braking frequent occurrence points smaller than that of the route Z3. On the other hand, the route Z3 has a short section in which a deterioration of a road is a predetermined level, compared with the route Z2. Therefore, in the example of FIG. 16, the route Z2 is presented as a safe route, and the route Z3 is presented as a comfortable route.

The presentation unit 46 presents, as candidate operation routes, extracted routes on an operation screen. Note that in a case where a transportation target item is specified by conditions of an operation route, the presentation unit 46 obtains, from the priority order information 36, priority orders of routes for the specified transportation target item and arranges routes in descending order of priority orders, thereby presenting the routes. In addition, in a case where a corresponding one of the business-use vehicles 11 is specified as a special-purpose vehicle by conditions of an operation route, the presentation unit 46 judges, based on the large-vehicle guiding road information 35, whether roads to be passed through on a route are roads along which the special-purpose vehicle is to travel, and the presentation unit 46 presents a route routed through a larger number of roads along which the special-purpose vehicle is to travel. The presentation unit 46 presents a route for which a ratio of roads along which the special-purpose vehicle is to travel is greater than or equal to a predetermined ratio (for example, 80%), for example. In addition, the presentation unit 46 presents routes for each of which a ratio of roads along which the special-purpose vehicle is to travel ranks between the top and a predetermined rank (for example, the third highest rank), for example. Note that the presentation unit 46 may present routes only routed through roads along which the special-purpose vehicle is to travel.

Figure 17:
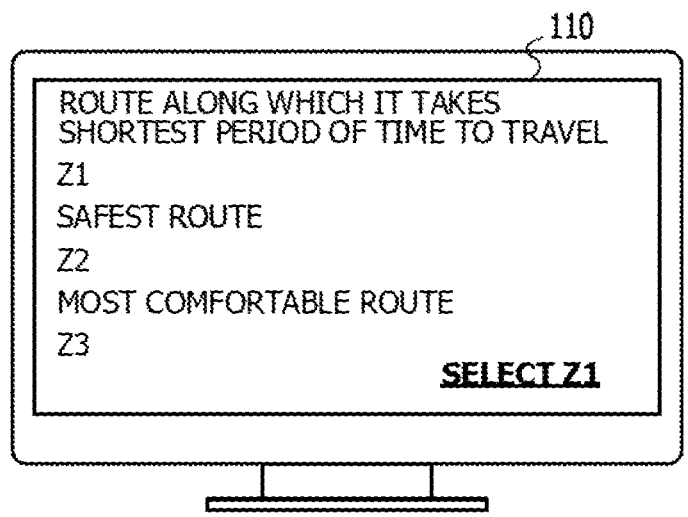
FIG. 17 is a diagram illustrating an example of an operation screen.

FIG. 17 is a diagram illustrating an example of an operation screen. On an operation screen 110, the route Z1 is presented as a route along which it takes the shortest period of time to travel, the route Z2 is presented as the safest route, and the route Z3 is presented as the most comfortable route. The operation screen 110 is enabled to select the presented routes. If a routes is selected by the operation screen 110, the presentation unit 46 presents, along the selected route, pieces of path information such as rest facilities defined as rest points, sudden-braking frequent occurrence points, and deteriorated-road sections, on the operation screen.

FIG. 18 is a diagram illustrating an example of path information displayed on an operation screen. The example of FIG. 18 illustrates path information displayed on an operation screen in a case where the route Z1 is selected. On the operation screen, interchanges to pass through on the route Z1, rest facilities defined as rest points, sudden-braking frequent occurrence points, and deteriorated-road sections are displayed, as the path information, along the route. In addition, on the operation screen, traveling times at predetermined points along the route such as expressway interchanges, junctions, and the rest facilities defined as rest points are displayed as the path information. In addition, on the operation screen, the calculated assumed degree of congestion and an estimated sojourn time of each of the rest facilities defined as rest points are displayed.

In addition, the operation screen 110 illustrated in FIG. 17 is enabled to select a confirmed operation route from among routes displayed as candidate operation routes. A person in charge of an operation instruction selects the confirmed operation route on which an operation is to be performed, from among the presented candidate operation routes. In the example of FIG. 17, the route Z1 is selected as the confirmed operation route.

In a case where the confirmed operation route is selected, the presentation unit 46 assigns a new route ID and stores, in the operation route information 37, information of the route selected as the confirmed operation route while associating the information of the selected route with the route ID. In addition, the presentation unit 46 presents the route selected as the confirmed operation route and the route ID on the operation screen.

Figure 19:
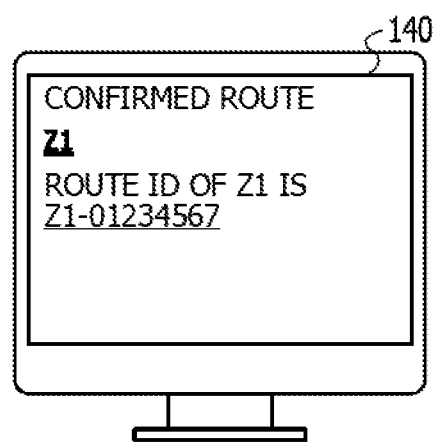
FIG. 19 is a diagram illustrating an example of an operation screen.

FIG. 19 is a diagram illustrating an example of an operation screen. The example of FIG. 19 illustrates an operation screen 140 in a case where the route Z1 is selected as the confirmed operation route. On the operation screen 140, a message and the route ID are displayed, the message indicating that the route Z1 is selected as the confirmed operation route.

The reception unit 40 receives, from the operation screen, inputting of a transmission destination of the information of the confirmed operation route.

Figure 20:
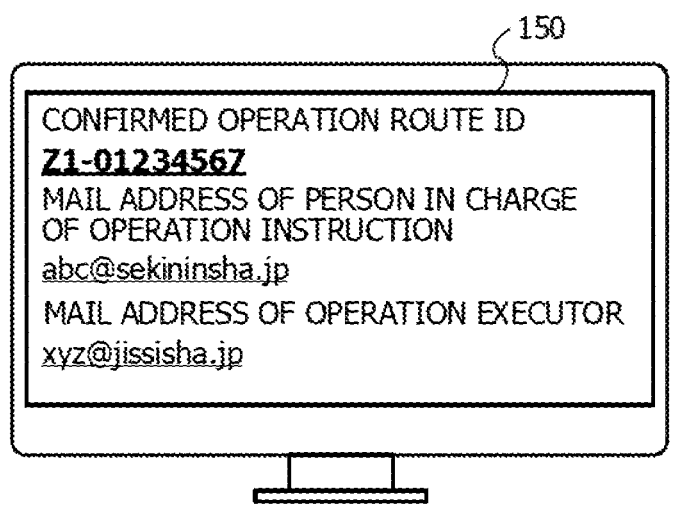
FIG. 20 is a diagram illustrating an example of an operation screen.

FIG. 20 is a diagram illustrating an example of an operation screen. On an operation screen 150, the route ID of the route Z1 defined as the confirmed operation route is indicated. In addition, a mail address of an operation executor is input to the operation screen 150. In addition, a mail address of a person in charge of an operation instruction is input to the operation screen 150.

Figure 21:
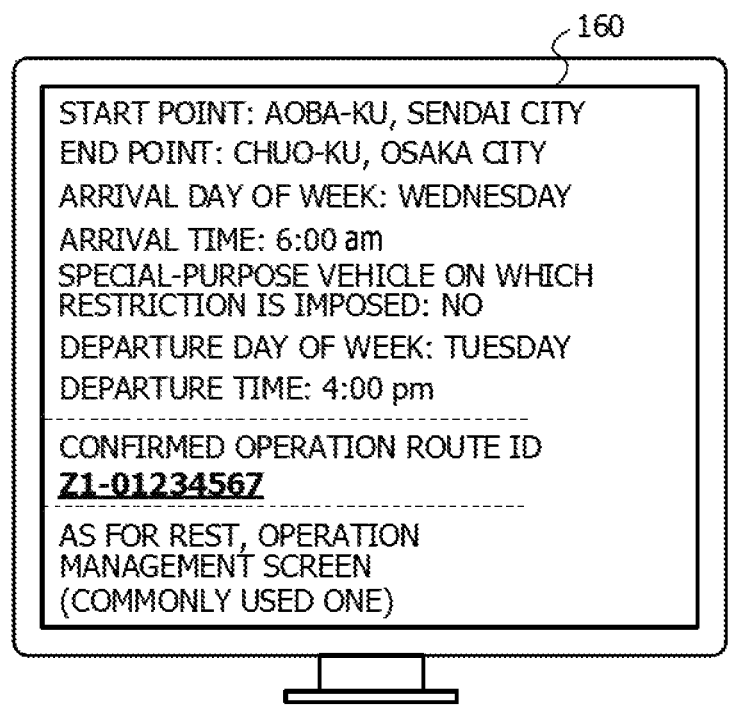
FIG. 21 is a diagram illustrating an example of an operation management screen.

The output unit 47 transmits link information of an operation management screen, to the mail address of the operation executor, input to the operation screen 150. In a case where a link of a mail is selected by the operation executor terminal 14 and the operation executor terminal 14 requests the operation management screen, the output unit 47 transmits, to the operation executor terminal 14 serving as a requester, screen information of the operation management screen, thereby causing the operation management screen to be displayed. FIG. 21 is a diagram illustrating an example of an operation management screen. On an operation management screen 160, specified conditions of an operation route are displayed. In addition, on the operation management screen 160, the route ID of the confirmed operation route is displayed. A link to the operation support device 10 is embedded in this route ID, and upon selecting the route ID, a request for the path information of a route of the route ID is transmitted to the operation support device 10. Upon receiving the request for the path information of a route of the specified route ID, the output unit 47 transmits, to a requestor, the path information illustrated in FIG. 18. In the operation executor terminal 14, by confirming the transmitted path information, the operation executor is able to confirm a detailed path of the specified confirmed operation route. Note that the output unit 47 may transmit, to the operation executor Z, the route ID and the path information illustrated in FIG. 18 by using a mail. In addition, by using a mail, the output unit 47 may transmit, to the operation executor terminal 14, the route ID in which the link to the operation support device 10 is embedded, along with the specified conditions of the operation route, and in a case where the route ID of the mail is subjected to a click operation, a display request for the path information illustrated in FIG. 18 may be transmitted to the operation support device 10.

For this reason, even in a case where the person in charge of an operation instruction and the operation executor are different, the operation support device 10 is able to cause the information of the confirmed operation route to be shared by the two, by using the route ID.

The reception unit 40 receives, from the operation management screen, not illustrated, inputting of an ID of a corresponding one of the business-use vehicles 11 which is to travel along the confirmed operation route. The operation executor inputs, from the operation management screen to the operation support device 10, identification information of the corresponding one of the business-use vehicles 11 which is to travel along the confirmed operation route. The reception unit 40 stores, in the specified route information 38, the received identification information of the corresponding one of the business-use vehicles 11 while associating the received identification information with the route ID of the confirmed operation route.

Based on the probe information collected from the corresponding one of the business-use vehicles 11, the monitoring unit 48 monitors an operation of the corresponding one of the business-use vehicles 11 for which the ID thereof is stored in the specified route information 38, and the monitoring unit 48 identifies an operation achievement route actually used for an operation by the corresponding one of the business-use vehicles 11. In response to requests from the request source terminal 13 and the operation executor terminal 14, the monitoring unit 48 notifies the requestors of a monitoring result. In addition, in a case where, based on the monitoring result, the operation achievement route deviates from a confirmed traveling route or a delay relative to a traveling time and greater than or equal to a predetermined period of time occurs, the monitoring unit 48 warns.

In addition, the monitoring unit 48 compares the confirmed operation route and the operation achievement route with each other, thereby comparing a plan and an achievement with each other. In response to requests from the request source terminal 13 and the operation executor terminal 14, the monitoring unit 48 notifies the requestors of a result of a comparison between the plan and the achievement.

Figure 22:
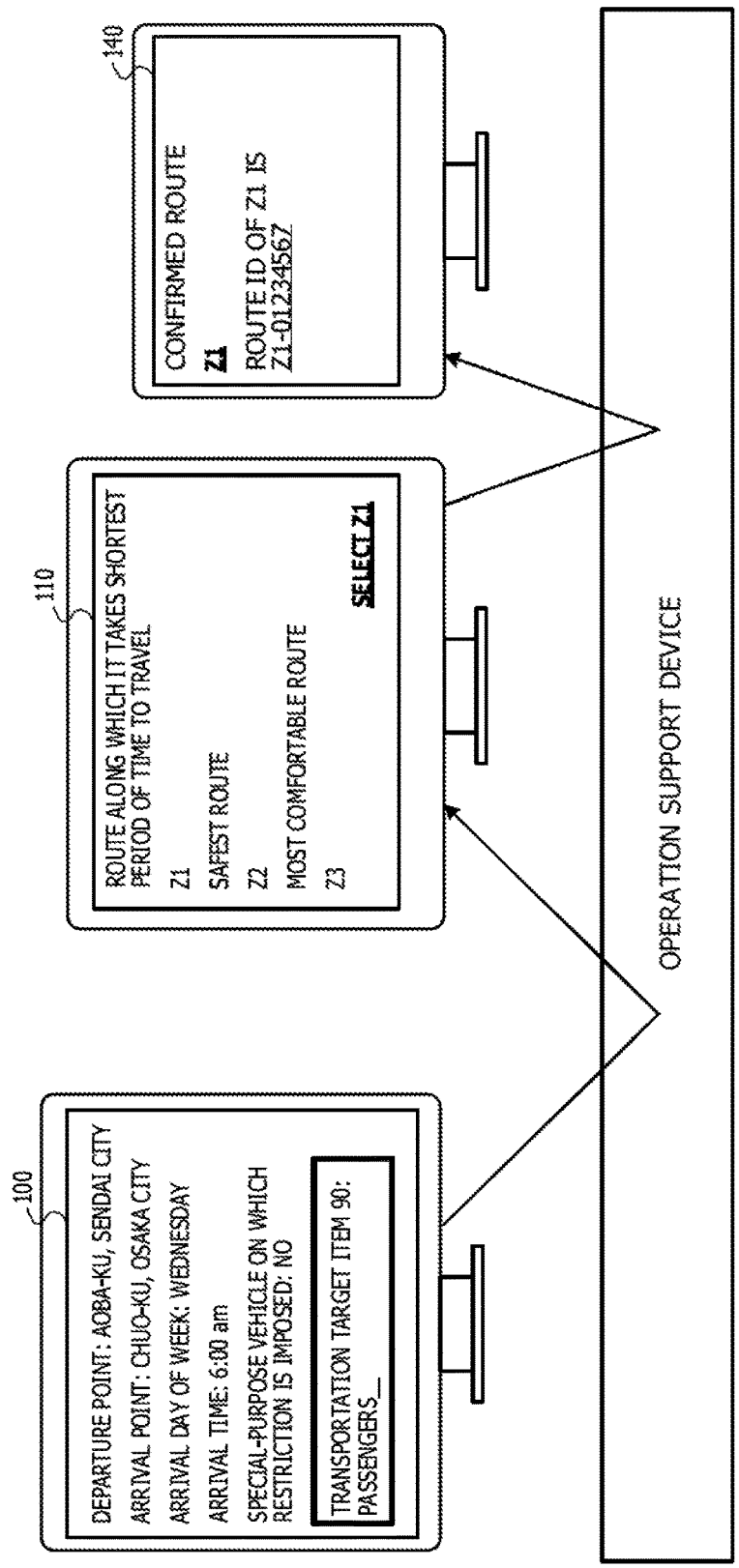
FIG. 22 is a diagram schematically illustrating a flow of an operation.

Here, a flow of an operation will be described therealong. Each of FIG. 22 to FIG. 25 is a diagram schematically illustrating a flow of an operation. As illustrated in FIG. 22 by using the operation screen 100, the person in charge of an operation instruction specifies a departure point, an arrival point, an arrival day of the week, an arrival time, whether or not a corresponding one of the business-use vehicles 11 is a special-purpose vehicle, and a transportation target item.

The operation support device 10 extracts, from the operation achievement information 31, routes each satisfying received conditions. In addition, the operation support device 10 presents, on the operation screen 110, the shortest route, a safe route, and a comfortable route.

The person in charge of an operation instruction selects, from the operation screen 110, a confirmed operation route. In the example of FIG. 22, the route Z1 is selected as the confirmed operation route. For this reason, even in a case of not understanding an actual road situation, the person in charge of an operation instruction is able to define an appropriate operation route by selecting the confirmed operation route from among routes presented by the operation support device 10.

The operation support device 10 presents, on the operation screen 140, a route selected as the confirmed operation route and the route ID thereof.

Figure 23:
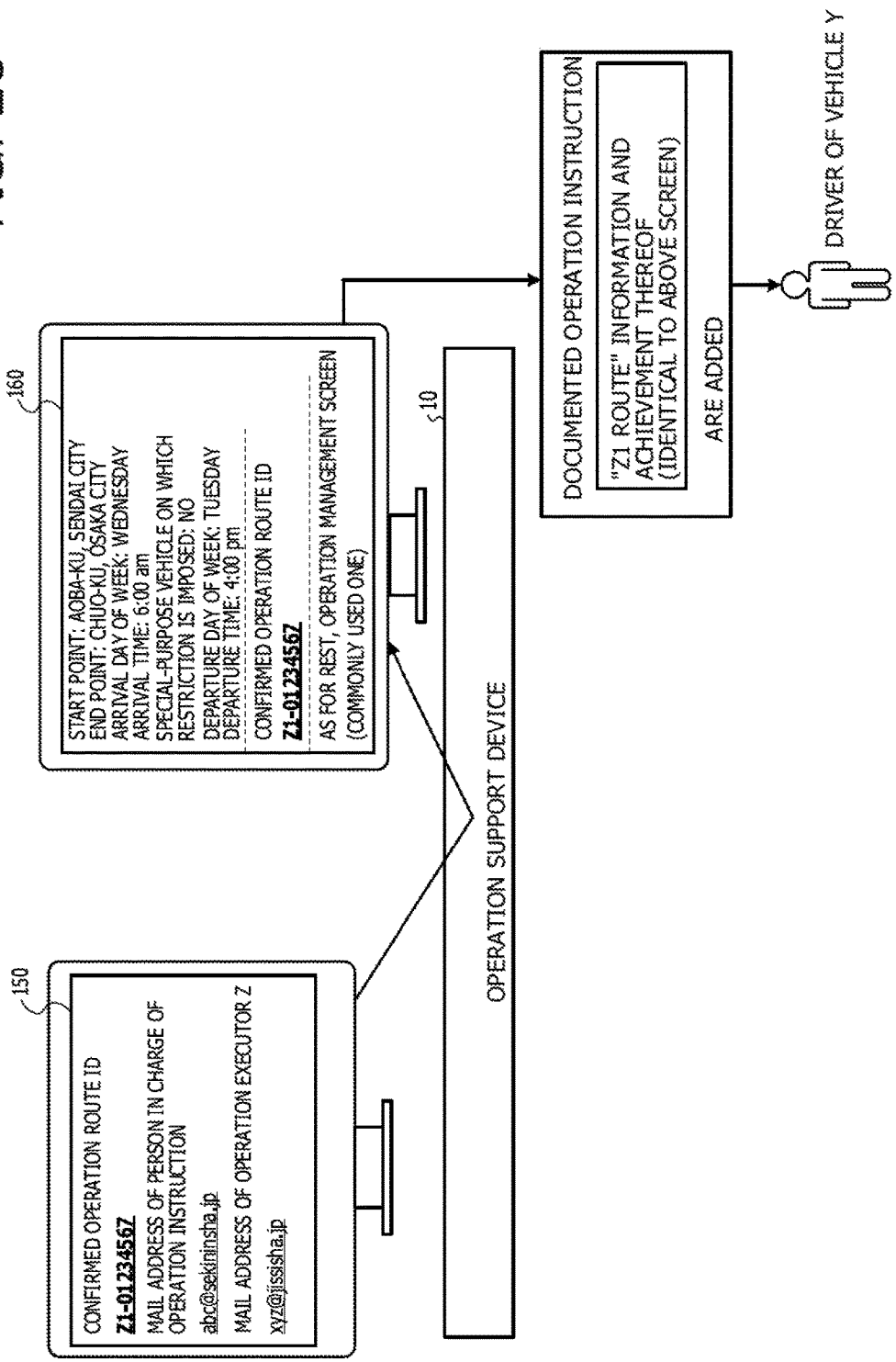
FIG. 23 is a diagram schematically illustrating a flow of an operation.

As illustrated in FIG. 23, from the operation screen 150, the person in charge of an operation instruction inputs a mail address of the operation executor serving as a target to be notified of the route selected as the confirmed operation route. In addition, the person in charge of an operation instruction inputs a mail address of the person in charge oneself.

The operation support device 10 transmits link information of the operation management screen 160, to the mail address of the operation executor Z, input to the operation screen 150.

By using the operation executor terminal 14, the operation executor Z requests an operation management screen from the operation support device 10 by use of a link of the received mail. As illustrated in FIG. 23, the operation support device 10 transmits, to the operation executor terminal 14 serving as a requestor, screen information of the operation management screen and causes the operation management screen 160 to be displayed. In a case where a route ID is selected, path information of a route of the route ID is displayed on the operation management screen 160. In the example of FIG. 23, the path information of the route Z1, illustrated in FIG. 18, is displayed. The operation executor Z determines one of the business-use vehicles 11 which is to be operated by using the displayed path information. In addition, the operation executor Z creates a documented operation instruction in which an operation plan is described, and delivers the documented operation instruction to a driver of the corresponding one of the business-use vehicles 11. In the example of FIG. 23, the documented operation instruction is delivered to a driver of a business-use vehicle Y. In this documented operation instruction, the path information of the route Z1 is described. In addition, the operation executor Z inputs, to the operation support device 10, identification information of the corresponding one of the business-use vehicles 11 that is to travel along the route of the route ID.

Figure 24:
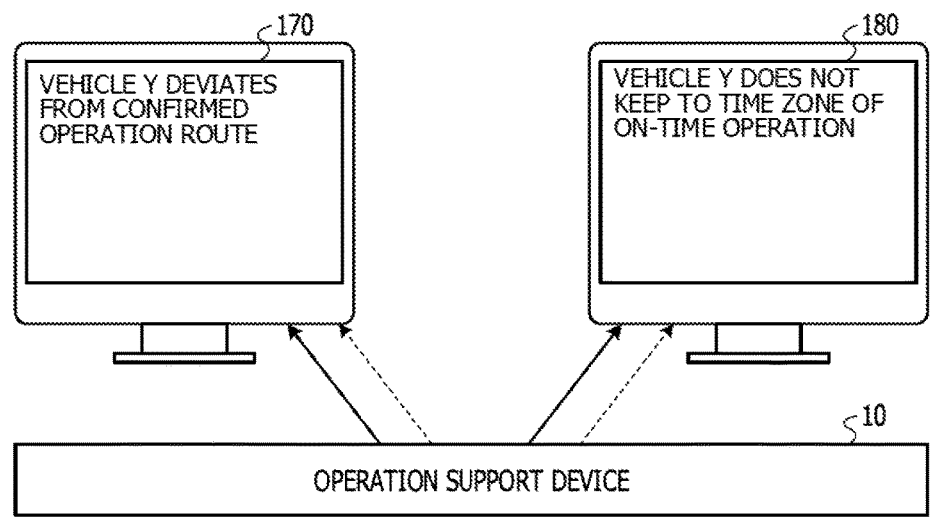
FIG. 24 is a diagram schematically illustrating a flow of an operation.

Based on the probe information collected from the corresponding one of the business-use vehicles 11, the operation support device 10 monitors an operation of the corresponding one of the business-use vehicles 11 for which the identification information thereof is stored in the specified route information 38, and the operation support device 10 identifies an operation achievement route actually used for an operation by the corresponding one of the business-use vehicles 11. In response to requests from the request source terminal 13 and the operation executor terminal 14, the operation support device 10 notifies the requestors of a monitoring result. In addition, in a case where, based on the monitoring result, the operation achievement route deviates from a confirmed traveling route, the operation support device 10 warns, for example. In addition, in a case where a delay, relative to a traveling time at one of individual points along the route of the route ID and greater than or equal to a predetermined period of time, occurs, the monitoring unit 48 warns. In the example of FIG. 24, a warning screen 170 on which a warning to the effect that the business-use vehicle Y deviates from the confirmed traveling route is displayed is displayed in the request source terminal 13. In addition, in the example of FIG. 24, a warning screen 180 on which a warning to the effect that a delay, relative to a traveling time and greater than or equal to a predetermined period of time, occurs in the business-use vehicle Y is displayed is displayed in the operation executor terminal 14.

Figure 25:
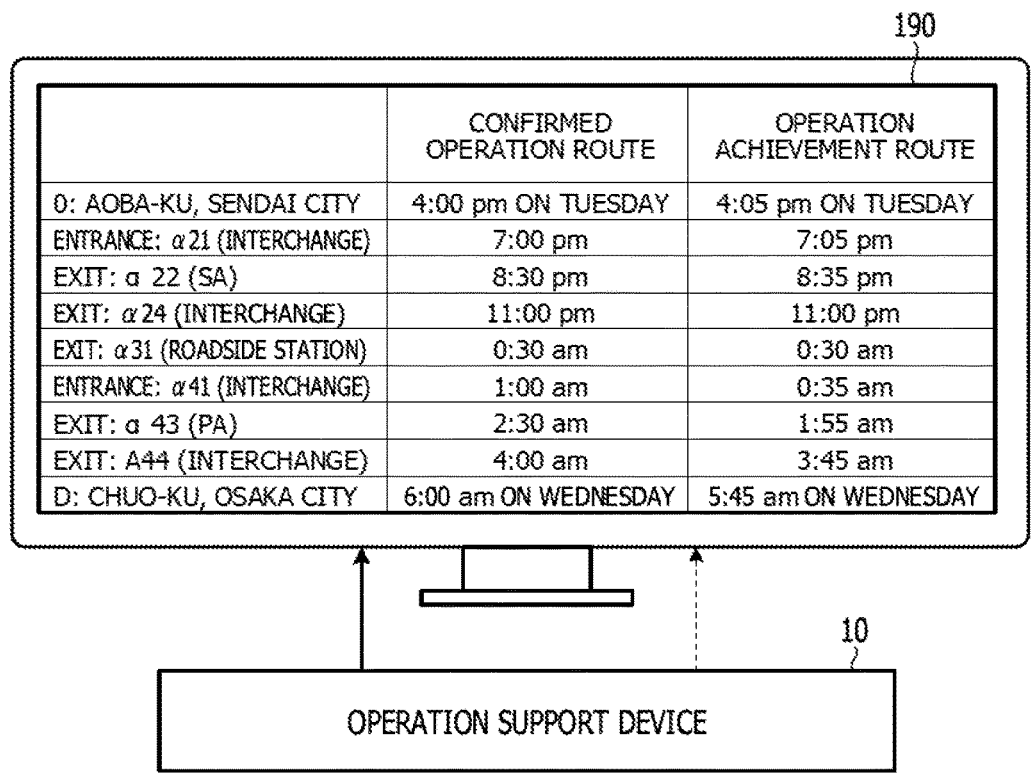
FIG. 25 is a diagram schematically illustrating a flow of an operation.

In addition, the operation support device 10 compares the confirmed operation route and the operation achievement route with each other, thereby comparing a plan and an achievement with each other. In addition, in response to requests from the request source terminal 13 and the operation executor terminal 14, the operation support device 10 notifies the requesters of a result of a comparison between the plan and the achievement. For each of points on the confirmed traveling route, the operation support device 10 outputs a comparison screen obtained by comparing a traveling time of the confirmed operation route and a traveling time of the operation achievement route, for example. In the example of FIG. 25, a comparison screen 190 is illustrated. In the comparison screen 190 illustrated in FIG. 25, a pattern is changed depending on a magnitude of a difference between a traveling time of the confirmed operation route and a traveling time of the operation achievement route and is displayed. Note that in a case of deviating from the confirmed operation route, an operation achievement route field is blank and a pattern is changed after the deviation, and an arrival time is displayed for an ending point.

For this reason, based on a result of a comparison between the plan and the achievement, the operation executor Z is able to understand whether or not there is a problem in an actual operation. In addition, the operation support device 10 is able to support creation of a daily operation report.

Flow of Processing

Figure 26:
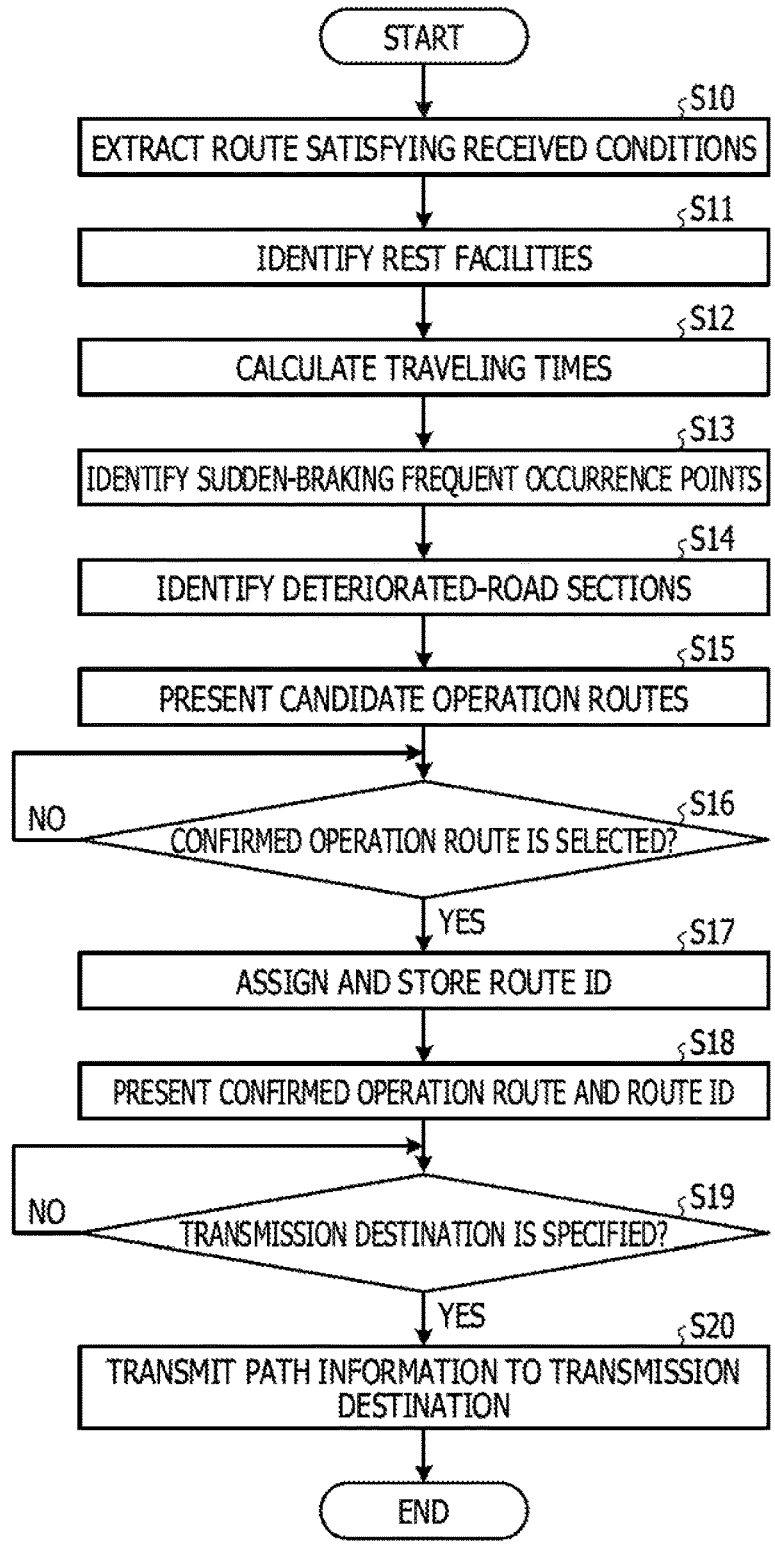
FIG. 26 is a flowchart illustrating an example of a procedure of operation support processing.

Next, a flow of operation support processing in which the operation support device 10 according to the present embodiment supports creation of an operation route will be described. FIG. 26 is a flowchart illustrating an example of a procedure of operation support processing. This operation support processing is performed at a predetermined timing, for example, a timing at which conditions of an operation route are specified and a predetermined operation instructing to start is performed.

As illustrated in FIG. 26, the route extraction unit 41 extracts, from the operation achievement information 31, a route satisfying the received conditions (S10). The route extraction unit 41 extracts, from the operation achievement information 31, a route obtained by departing from or passing through a surrounding area of a received departure place and by arriving at an arrival place within a predetermined time range of a received arrival time or passing through the arrival place at a frequency greater than or equal to a predetermined number of times, the departure place and the arrival time being received by using the operation screen 100, for example.

For each of the extracted routes, the rest facility identification unit 42 identifies rest facilities for each of which a period of time taken to travel along the relevant extracted route does not exceed a predetermined period of time (S11). For each of the extracted routes, the traveling time calculation unit 43 calculates traveling times along the relevant route (S12).

For each of the extracted routes, the braking point identification unit 44 identifies, from the braking point information 32, a point at which the frequency of occurrence of predetermined braking on the relevant route is greater than or equal to a predetermined level (S13). For each of the extracted routes, the deteriorated section identification unit 45 identifies, from the deteriorated section information 33, a section in which a deterioration of a road is greater than or equal to a predetermined level on the relevant route (S14).

The presentation unit 46 presents, on an operation screen, the extracted routes as candidate operation routes (S15). In a case where routes are extracted, the presentation unit 46 presents, as the shortest route, a route on which a period of time taken to travel from a departure point and to arrive at an arrival point is the shortest, for example. In addition, from among routes on each of which an increase in a period of time taken to travel therealong falls within a predetermined level, compared with a period of time taken to travel along the shortest route, the presentation unit 46 presents, as a safe route, a route having a minimum number of sudden-braking frequent occurrence points and having a greater number of rest facilities. In addition, from among the routes on each of which an increase in a period of time taken to travel therealong falls within a predetermined level, compared with the period of time taken to travel along the shortest route, the presentation unit 46 presents, as a comfortable route, a route having the shortest section in which a deterioration of a road is greater than or equal to a predetermined level and having a smaller number of sudden-braking frequent occurrence points.

The presentation unit 46 determines whether or not a confirmed operation route is selected (S16). In a case where no confirmed operation route is selected (S16: Negative), the processing makes a transition to S16 again.

On the other hand, in a case where the confirmed operation route is selected (S16: Affirmative), the presentation unit 46 assigns a new route ID and stores, in the operation route information 37, information of the route selected as the confirmed operation route while associating the information of the selected route with the route ID (S17). The presentation unit 46 presents the route selected as the confirmed operation route and the route ID on the operation screen (S18).

The reception unit 40 determines whether or not a transmission destination of information of the confirmed operation route is specified (S19). In a case where no transmission destination is specified (S19: Negative), the processing makes a transition to S19 again.

On the other hand, in a case where the transmission destination is specified (S19: Affirmative), the output unit 47 transmits, to the transmission destination, the route ID and the path information illustrated in FIG. 18, by using a mail (S20) and terminates the processing.

Advantages

As described above, the operation support device 10 according to the present embodiment receives the specifications of a departure point, an arrival point, and an arrival time. By referencing the storage unit 21 in which the operation achievement information 31 storing therein a route of an operation including location information for each time for a corresponding one of vehicles is stored, the operation support device 10 extracts achievement information of operations, obtained by departing from or passing through a surrounding area of a received departure place and by arriving at or passing through an arrival place within a predetermined time range of the received arrival time. From the extracted achievement information, the operation support device 10 presents, as candidates for an operation path, common routes, the number of which is greater than or equal to a predetermined number. For this reason, the operation support device 10 is able to present an appropriate operation route.

In addition, the operation support device 10 according to the present embodiment further receives a specification of an arrival day of the week. From the achievement information, the operation support device 10 extracts routes each obtained by arriving at or passing through the arrival point within a predetermined time period containing the received arrival time on the arrival day of the week and by traveling therealong from the departure point to the arrival point at a frequency greater than or equal to a predetermined number of times. For this reason, even in a case where a road situation varies depending on a day of the week, routes each obtained by traveling therealong on the arrival day of the week at a frequency greater than or equal to a predetermined number of times are extracted. Therefore, the operation support device 10 is able to present appropriate operation routes corresponding to the arrival day of the week.

In addition, the operation support device 10 according to the present embodiment references the rest facility information 34 and identifies, from among rest facilities located on the extracted routes, a rest facility in which a driver is caused to rest for each period of time less than or equal to a predetermined continuous traveling period of time. For this reason, the operation support device 10 is able to easily create an operation plan that causes a driver to rest in a rest facility for each period of time less than or equal to the predetermined continuous traveling period of time.

In addition, the operation support device 10 according to the present embodiment references a third storage unit storing therein locations and occurrence information of risky driving for each of time zones at the relevant locations and identifies the frequencies of occurrence of risky driving in a traveling time zone on the extracted routes. The operation support device 10 references the braking point information 32 and identifies points at each of which the frequency of occurrence of braking is greater than or equal to a predetermined level, for example. The operation support device 10 further presents locations at each of which the frequency of occurrence of braking in each of the routes exceeds a predetermined frequency of occurrence. For this reason, the operation support device 10 is able to present locations at each of which the frequency of occurrence of risky driving exceeds a predetermined frequency of occurrence.

In addition, the operation support device 10 according to the present embodiment references a fourth storage unit storing therein locations and deterioration information of roads at the locations and extracts locations for each of which deterioration information in a route is registered. The operation support device 10 references the deteriorated section information 33 and identifies a section in which a deterioration of a road is greater than or equal to a predetermined level on each of the extracted routes, for example. The operation support device 10 presents locations for each of which deterioration information in a corresponding one of routes is registered. For this reason, the operation support device 10 is able to present locations for each of which the deterioration information is registered.

In addition, in a case where routes are extracted, the operation support device 10 according to the present embodiment presents, as the shortest route, a route on which a period of time taken to travel from the departure point and to arrive at the arrival point is the shortest. From among routes on each of which an increase in a period of time taken to travel therealong falls within a predetermined level, compared with a period of time taken to travel along the shortest route, the operation support device 10 presents, as a safe route, a route having a minimum number of locations at each of which the frequency of occurrence of risky driving exceeds a predetermined frequency of occurrence and having a greater number of rest facilities. From among the routes on each of which an increase in a period of time taken to travel therealong falls within the predetermined level, compared with the period of time taken to travel along the shortest route, the operation support device 10 presents, as a comfortable route, a route having the shortest section in which a deterioration of a road is greater than or equal to a predetermined level and having a smaller number of locations at each of which the frequency of occurrence of risky driving exceeds the predetermined frequency of occurrence. For this reason, the operation support device 10 is able to present the shortest route, a safe route, and a comfortable route and is able to cause a traveling route to be easily selected in accordance with a merchandise item to be transported.

In addition, the operation support device 10 according to the present embodiment presents, along a route, rest facilities, points at each of which the frequency of occurrence of braking is greater than or equal to a predetermined level, and sections in each of which a deterioration of a road is greater than or equal to a predetermined level. For this reason, a user such as a person in charge of an operation instruction of a request source or an operation executor is able to understand, along a route, rest facilities, points at each of which the frequency of occurrence of braking is greater than or equal to a predetermined level, and sections in each of which a deterioration of a road is greater than or equal to a predetermined level.

In addition, the operation support device 10 according to the present embodiment receives a specification of a transportation target item to be transported. In accordance with the transportation target item, the operation support device 10 changes a priority order of display of the shortest route, a safe route, or a comfortable route. For this reason, in accordance with a merchandise item to be transported, the operation support device 10 is able to present a priority order of an appropriate route so that the priority order of an appropriate route is ranked high.

Second Embodiment

By the way, while so far an embodiment related to the disclosed device is described, the disclosed technology may be implemented in various different embodiments in addition to the above-mentioned embodiment. Therefore, in what follows, another embodiment included in the present technology will be described.

In the above-mentioned embodiment, a case where traveling times at predetermined points along a route, rest facilities defined as rest points, sudden-braking frequent occurrence points, and deteriorated-road sections are presented is exemplified, for example. However, there is no limitation to these. The operation support device 10 according to the present embodiment may generate and output operation plan information along a selected route, for example. For this reason, the operation support device 10 is able to support creation of an operation plan of a user such as a person in charge of an operation instruction of a request source or an operation executor.

In addition, in the above-mentioned embodiment, in a case where a corresponding one of the business-use vehicles 11 is specified as a special-purpose vehicle, a case where a route routed through a larger number of roads along which the special-purpose vehicle is to travel is presented is exemplified. However, there is no limitation to these. In a case where, based on the monitoring device information 30, one of the business-use vehicles 11, in which a corresponding one of the operation monitoring devices 12 is mounted, satisfies conditions of the special-purpose vehicle, the presentation unit 46 may present a route routed through a larger number of roads along which the special-purpose vehicle is to travel.

In addition, each of configuration components in each of devices illustrated in drawings is functional and conceptual and does not have to be physically configured in such a way as illustrated in the drawings. In other words, specific states of the distribution or integration of the individual devices are not limited to these illustrated in the drawings, and all or part of the individual devices may be functionally or physically distributed or integrated in arbitrary units depending on various kinds of loads and various usage situations. The respective processing units of the reception unit 40, the route extraction unit 41, the rest facility identification unit 42, the traveling time calculation unit 43, the braking point identification unit 44, the deteriorated section identification unit 45, the presentation unit 46, the output unit 47, and the monitoring unit 48 may be arbitrarily integrated, for example. In addition, processing of each of the processing units may be arbitrarily separated into processing operations in respective processing units. Furthermore, all or an arbitrary part of processing functions performed by the respective processing units may be realized by a CPU and a program analyzed and executed by the CPU or may be realized as hardware based on hard-wired logic.

Operation Support Program

Figure 27:
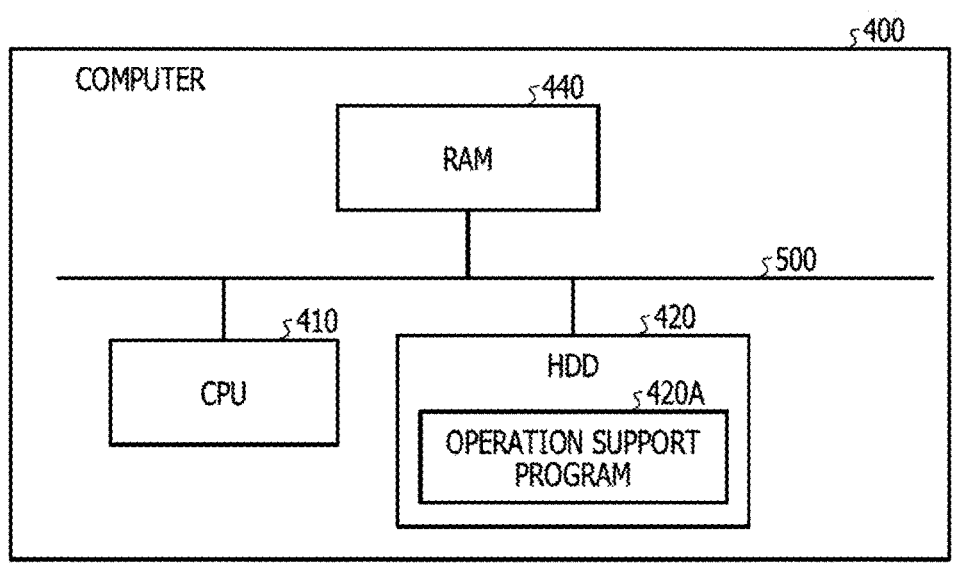
FIG. 27 is a diagram illustrating an example of a configuration of a computer to execute an operation support program.

In addition, various types of processing described in the above-mentioned embodiments may be realized by executing a preliminarily prepared program by use of a computer system such as a personal computer or a workstation. Therefore, in what follows, an example of a computer system that executes an operation support program to support an operation will be described. FIG. 27 is a diagram illustrating an example of a configuration of a computer to execute an operation support program.

As illustrated in FIG. 27, a computer 400 includes a central processing unit (CPU) 410, a hard disk drive (HDD) 420, and a random access memory (RAM) 440. These individual units 400 to 440 are connected, to one another to via a bus 500.

In the HDD 420, an operation support program 420A to fulfill the same functions as those of the reception unit 40, the route extraction unit 41, the rest facility identification unit 42, the traveling time calculation unit 43, the braking point identification unit 44, the deteriorated section identification unit 45, the presentation unit 46, the output unit 47, and the monitoring unit 48, described above, are preliminarily stored. Note that the operation support program 420A may be arbitrarily separated.

In addition, the HDD 420 stores therein various types of information. In the same way as the storage unit 21, the HDD 420 stores therein various types of data used for an OS and support of an operation, for example.

In addition, the CPU 410 reads, from the HDD 420, and executes the operation support program 420A, thereby performing the same operations as those of the respective processing units in the embodiments. In other words, the operation support program 420A performs the same operations as those of the reception unit 40, the route extraction unit 41, the rest facility identification unit 42, the traveling time calculation unit 43, the braking point identification unit 44, the deteriorated section identification unit 45, the presentation unit 46, the output unit 47, and the monitoring unit 48.

Note that the above-mentioned operation support program 420A does not have to be stored in the HDD 420 from the beginning. In addition, the operation support program 420A may be stored in "portable physical media" such as, for example, a flexible disk (FD), a CD-ROM, a DVD disk, a magneto-optical disk, and an IC card, which are to be inserted into the computer 400. In addition, the computer 400 may read, from these, and execute the program.

Furthermore, the program is stored in "other computers (or servers)" connected to the computer 400 via a public line, the Internet, a LAN, a WAN, or the like. In addition, the computer 400 may read, from these, and execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method executed by a computer, the method comprising:
 receiving an input of a departure point, an arrival point, and a desired arrival time of a specific vehicle to be operated;
 extracting, from a plurality of route information, a part of route information corresponding to routes that departed from or passed through around the departure point, and arrived at or passed through around the arrival point within a certain time range of the desired arrival time, the plurality of route information being acquired from a plurality of computers which have moved with vehicles, and including positions of the vehicles at various times;
 classifying the part of route information into a plurality of route groups by comparing each other;
 counting a number of route information classified in each route groups;
 calculating, for each route groups, a ratio of the number of route information classified in each route groups to total number of the part of route information; and
 outputting operation information based on the ratio, the operation information including at least one of specific route as candidates for the specific vehicle.

2. The method according to claim 1, wherein
 the input includes information of a desired arrival day of a week, and
 the extracting extracts the part of route information corresponding to the routes that the specific vehicle departed from or passed through around the departure point, and arrived at or passed through around the arrival point within the certain time range of the desired arrival time on the desired arrival day of the week.

3. The method according to claim 1, wherein the at least one of specific route included in each of specific route groups which have the ratio greater than or equal to a threshold.

4. The method according to claim 1, further comprising:
 identifying, based on facility information related to locations of rest facilities, rest facilities being included in each of the routes;
 selecting, from among the rest facilities, a rest facility used for causing a driver of the vehicle to rest for each certain period of time; and
 calculating a traveling time by adding a period of time taken to sojourn in the rest facility, to a period of time taken to travel along the routes respectively.

5. The method according to claim 1, further comprising:
 identifying occurrence frequency of risky driving on each of the routes, based on risk information related to occurrence of risky driving in each of locations,
 wherein the operation information includes a location having the occurrence frequency that exceeds a threshold in the at least one of specific route.

6. The method according to claim 5, wherein
the occurrence frequency is identified for each of time zones, and
the operation information including the location having the occurrence frequency that exceeds the threshold in a specific time zone.

7. The method according to claim 6, wherein, when a number of the at least one of specific route is two or more, the operation information includes only specific route having a minimum number of locations at each of which the occurrence frequency exceeds the threshold value in the specific time zone.

8. The method according to claim 1, further comprising:
based on deterioration information of a road, extracting a section for which the deterioration information is registered,
wherein the operation information includes the se ion in the at east one of specific route.

9. The method according to claim 8, wherein, when a number of the at least one of specific routes is two or more, the operation information includes only specific route having the shortest section for which the deterioration information is registered.

10. The method according to claim 1, wherein, when a number of the at least one of specific routes is two or more, the operation information includes only specific route, on which a period of time taken to travel from the departure point and to arrive at the arrival point is the shortest.

11. The method according to claim 1, wherein the operation information includes locations of rest facilities, points at each of which an occurrence frequency of sudden braking is greater than or equal to a certain number, and sections in each of which a road is deteriorated in the at least one of specific route.

12. The method according to claim 1, wherein the input further includes a specification of a transportation target item to be transported by the specific vehicle.

13. The method according to claim 12, further comprising:
when a number of the at least one of specific routes is two or more, determining priority orders of display of the at least one of specific routes in accordance with the transportation target item.

14. The method according to claim 1, further comprising:
when a specific route is selected from among the at least one of specific route after the outputting of the operation information, outputting an operation plan of the specific vehicle along the selected specific route.

15. A non-transitory computer-readable storage medium storing a program that causes a computer to execute a process, the process comprising:
receiving an input of a departure point, an arrival point, and a desired arrival time of a specific vehicle to be operated;
extracting, from a plurality of route information, a part of route information corresponding to routes that departed from or passed through around the departure point, and arrived at or passed through around the arrival point within a certain time range of the desired arrival time, the plurality of route information being acquired from a plurality of computers which have moved with vehicles, and including positions of the vehicles at various times;
classifying the part of route information into a plurality of route groups by comparing each other;
counting a number of route information classified in each route groups;
calculating, for each route groups, a ratio of the number of route information classified in each route groups to total number of the part of route information; and
outputting operation information based on the ratio, the operation information including at least one of specific route as candidates for the specific vehicle.

16. A device comprising:
a memory; and
a processor coupled to the memory and configured to:
receive an input of a departure point, an arrival point, and a desired arrival time of a specific vehicle to be operated,
extract, from a plurality of route information, a part of route information corresponding to routes that departed from or passed through around the departure point, and arrived at or passed through around the arrival point within a certain time range of the desired arrival time, the plurality of route information being acquired from a plurality of computers which have moved with vehicles, and including positions of the vehicles at various times,
classify the part of route information into a plurality of route groups by comparing each other,
count a number of route information classified in each route groups,
calculate, for each route groups, a ratio of the number of route information classified in each route groups to total number of the part of route information, and
output operation information based on the ratio, the operation information including at least one of specific route as candidates for the specific vehicle.

* * * * *